United States Patent
Matsui

(10) Patent No.: US 10,884,682 B2
(45) Date of Patent: Jan. 5, 2021

(54) STORAGE MEDIUM, METHOD, AND APPARATUS FOR INDICATING WHETHER COMMUNICATION WITH A DEVICE CONNECTED TO A NETWORK IS POSSIBLE OR NOT

(71) Applicant: CANON KABUSHIKI KAISHA, Tokyo (JP)

(72) Inventor: Yusuke Matsui, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/968,956

(22) Filed: May 2, 2018

(65) Prior Publication Data

US 2018/0329659 A1   Nov. 15, 2018

(30) Foreign Application Priority Data

May 12, 2017   (JP) .................. 2017-095847

(51) Int. Cl.
| | | |
|---|---|---|
| *G06F 3/12* | (2006.01) | |
| *H04N 1/00* | (2006.01) | |
| *H04L 29/12* | (2006.01) | |

(52) U.S. Cl.
CPC .......... *G06F 3/1231* (2013.01); *G06F 3/1204* (2013.01); *G06F 3/1226* (2013.01); *G06F 3/1236* (2013.01); *G06F 3/1285* (2013.01); *H04L 61/2015* (2013.01); *H04N 1/00411* (2013.01); *H04L 61/1511* (2013.01); *H04L 61/6022* (2013.01)

(58) Field of Classification Search
CPC .... G06F 3/1254; G06F 3/1231; G06F 3/1226; G06F 3/1204; G06F 3/1236; G06F 3/1285; H04N 1/00411; H04L 61/1511; H04L 61/6022; H04L 61/2015
See application file for complete search history.

(56) References Cited

U.S. PATENT DOCUMENTS

| | | | |
|---|---|---|---|
| 7,406,513 B2 * | 7/2008 | Furukawa | H04L 29/12018 709/220 |
| 2006/0069807 A1 * | 3/2006 | Tagawa | H04L 61/20 709/245 |

(Continued)

FOREIGN PATENT DOCUMENTS

| | | |
|---|---|---|
| JP | 2013247606 A | 12/2013 |
| JP | 2015132973 A | 7/2015 |

OTHER PUBLICATIONS

Japanese Office Action issued in corresponding Japanese Application No. 2017-095847 dated Nov. 9, 2020.

*Primary Examiner* — Juan M Guillermety

(74) *Attorney, Agent, or Firm* — Venable LLP

(57) ABSTRACT

An apparatus connected to a network executes search processing of searching for a device connected to the network, displays a selection screen including identification information corresponding to the device connected to the network based on a search result of the search processing, and designates a device based on operation of a user using the selection screen. In response to designation of the device, based on setting information for communication stored in the apparatus and information of the designated device obtained by the search processing, the apparatus displays a screen indicating whether it is possible to communicate with the designated device using the setting information.

17 Claims, 16 Drawing Sheets

(56) References Cited

U.S. PATENT DOCUMENTS

| | | | |
|---|---|---|---|
| 2006/0092134 A1* | 5/2006 | Ohara | H04L 69/18 345/161 |
| 2006/0288116 A1* | 12/2006 | Seki | H04L 63/102 709/232 |
| 2007/0088780 A1* | 4/2007 | Sato | H04N 1/00244 709/204 |
| 2007/0136485 A1* | 6/2007 | Mitsui | G06F 9/4411 709/230 |
| 2007/0239860 A1* | 10/2007 | Shirai | H04L 61/2015 709/221 |
| 2009/0175200 A1* | 7/2009 | Abe | H04L 12/2809 370/254 |
| 2009/0278663 A1* | 11/2009 | Takeda | G06K 17/00 340/10.1 |
| 2011/0238800 A1* | 9/2011 | Ishimoto | H04L 29/12028 709/221 |
| 2012/0054320 A1* | 3/2012 | Yoshida | G06F 3/1462 709/219 |
| 2014/0085677 A1* | 3/2014 | Saito | H04N 1/00482 358/1.15 |
| 2014/0250213 A1* | 9/2014 | Seki | G06K 15/4045 709/220 |
| 2015/0060547 A1* | 3/2015 | Nagasawa | G06F 3/1236 235/454 |
| 2015/0062633 A1* | 3/2015 | Asai | G06F 3/1236 358/1.15 |
| 2015/0234622 A1* | 8/2015 | Yamaguchi | H04L 61/103 358/1.15 |
| 2015/0261483 A1* | 9/2015 | Kato | G06F 3/1236 358/1.15 |
| 2016/0350035 A1* | 12/2016 | Horikoshi | G06F 3/1204 |

* cited by examiner

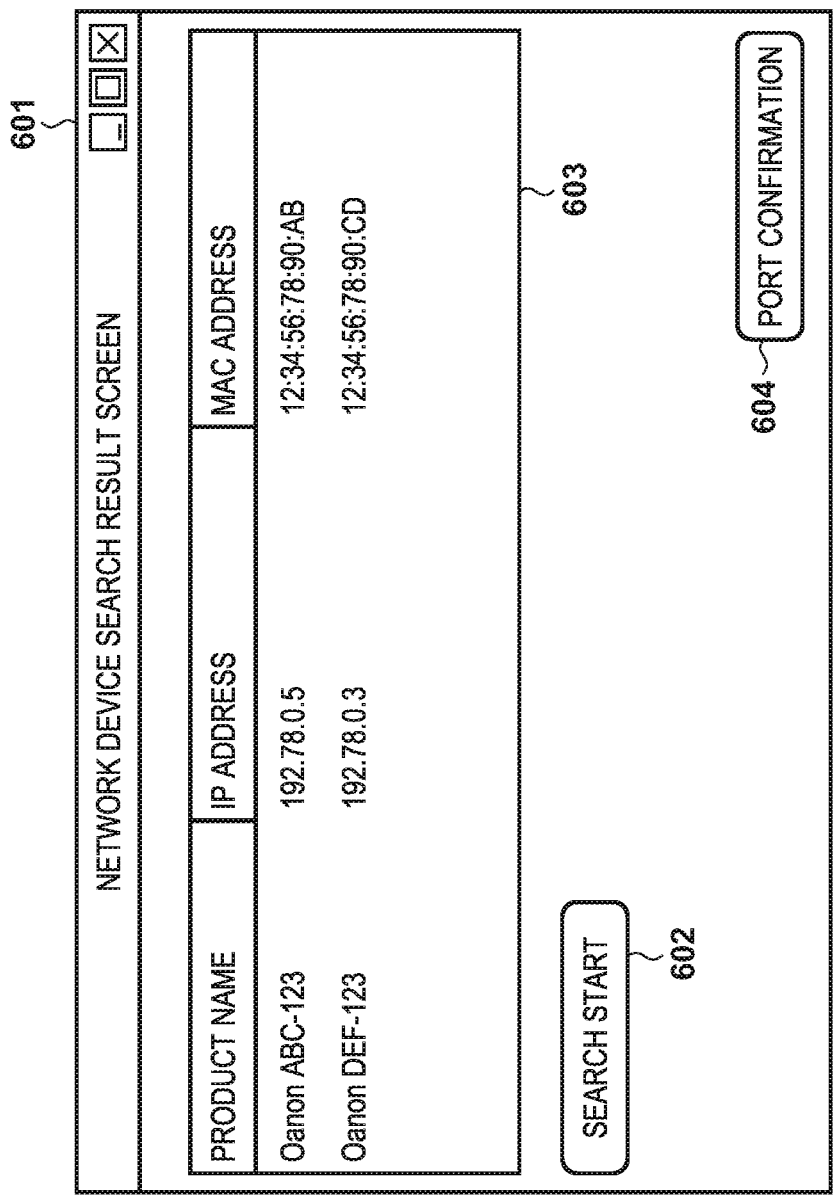

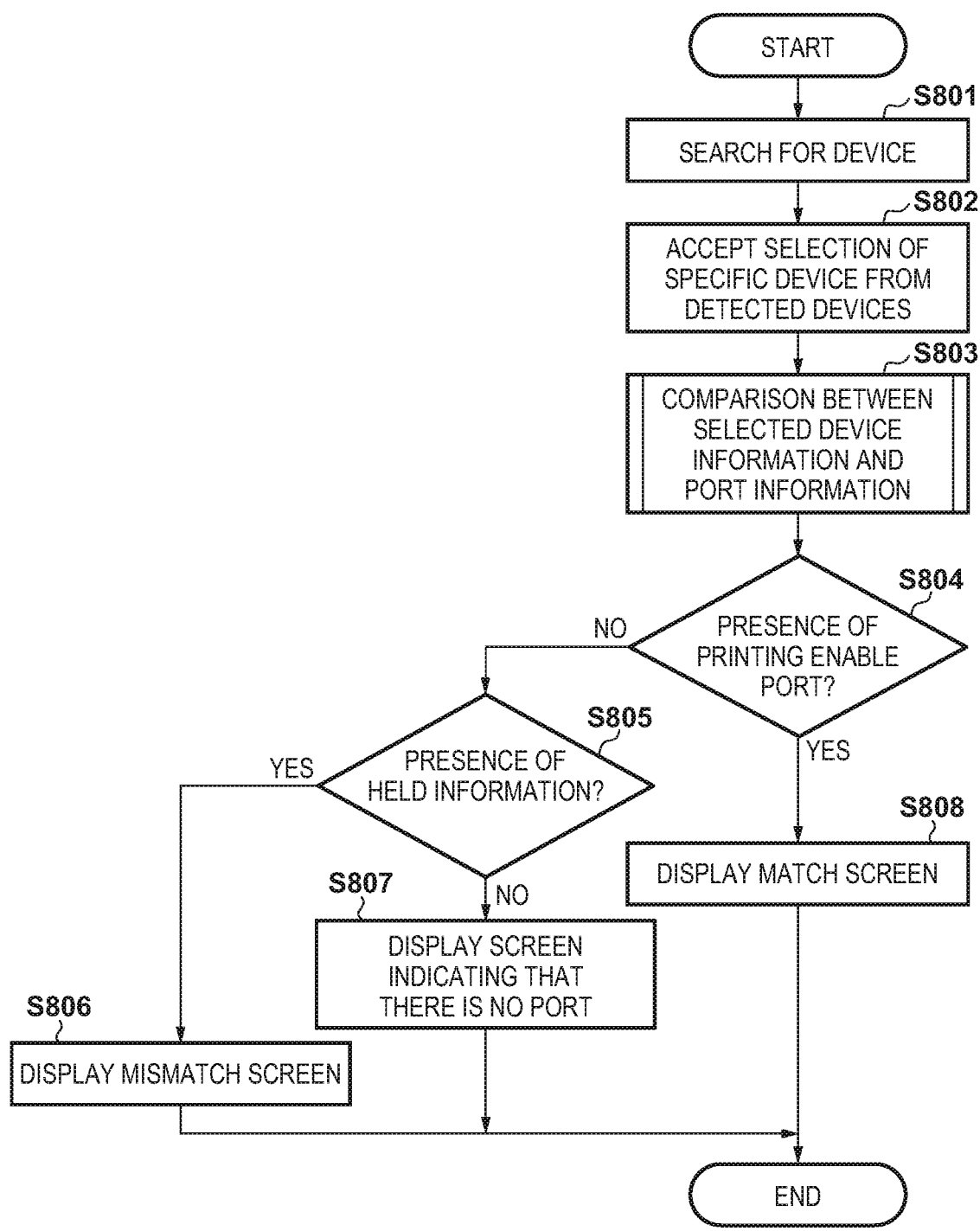

STORAGE MEDIUM, METHOD, AND APPARATUS FOR INDICATING WHETHER COMMUNICATION WITH A DEVICE CONNECTED TO A NETWORK IS POSSIBLE OR NOT

BACKGROUND OF THE INVENTION

Field of the Invention

The present invention relates to a communication setting technique between apparatuses.

Description of the Related Art

To control a printer from a computer in an environment in which the computer and the printer are connected to one network, the computer needs to install a dedicated driver and generate a port. Destination information such as an IP address as the destination of the printer is set in the port, thereby allowing the computer to transmit print data to the target printer based on the setting. Japanese Patent Laid-Open No. 2015-132973 describes a technique of performing, based on information about the state (for example, print queue information) of a computer and the state of a printer, diagnosis and restoration when an error occurs.

For example, if a print driver has not been installed or a user has deleted a printer driver, there is no print queue information. In this case, in the technique described in Japanese Patent Laid-Open No. 2015-132973, it may be impossible to confirm whether the environment is that in which the computer can transmit print data to the printer or to perform restoration, as needed. That is, if setting information with a partner apparatus does not exist or disappears in a communication apparatus, it is impossible to confirm whether the current status is a status in which communication with the partner apparatus can be performed and to restore the setting information, as needed.

SUMMARY OF THE INVENTION

The present invention allows a communication apparatus to readily confirm a communication setting status with a partner apparatus.

According to one aspect of the present invention, there is provided a non-transitory computer-readable storage medium storing a computer program for causing a computer, included in an apparatus connected to a network, to: execute search processing of searching for a device connected to the network; display, on a display unit, a selection screen including identification information corresponding to the device connected to the network based on a search result of the search processing; designate a device based on operation of a user using the selection screen; and display, on the display unit, based on setting information for communication stored in the apparatus and information of the designated device obtained by the search processing, a screen indicating whether it is possible to communicate with the designated device using the setting information.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention, and together with the description, serve to explain the principles of the invention.

FIG. 6 is a view showing an example of a UI screen;

FIG. 8 is a flowchart illustrating an example of the procedure of processing executed by the computer;

DESCRIPTION OF THE EMBODIMENTS

An exemplary embodiment(s) of the present invention will now be described in detail with reference to the drawings. It should be noted that the relative arrangement of the components, the numerical expressions and numerical values set forth in these embodiments do not limit the scope of the present invention unless it is specifically stated otherwise. Note that the following embodiment is merely an example. Some of exemplary components and steps of a method may be omitted, and components and steps that are not exemplified may be added. Furthermore, in the following arrangement, two or more blocks may be integrated and one block may be divided into two or more blocks. The order of the steps of the method may be reversed within a possible range or the steps may be executed at the same time.

System Configuration

Figure 1:
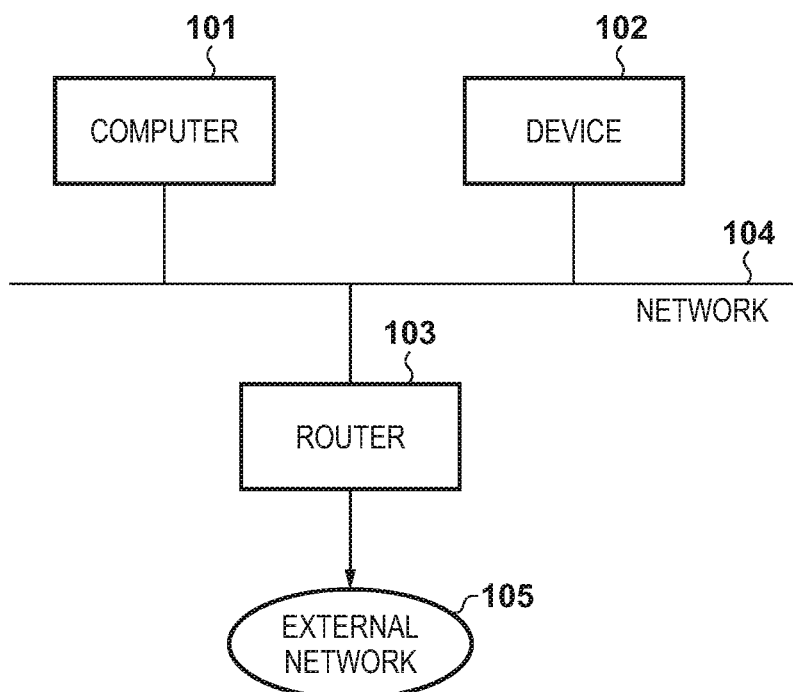
FIG. 1 is a view showing an example of the configuration of a system.

FIG. 1 shows an example of the configuration of a system according to the embodiment. This system includes a computer 101, a device 102, and a router 103. These apparatuses are connected to a common network 104. Note that the computer 101 can be, for example, an arbitrary information processing apparatus such as a PC (Personal Computer), tablet computer, PDA (Personal Digital Assistant), or smartphone. The device 102 is, for example, a peripheral device such as a printer, copying machine, facsimile apparatus, or scanner, or an apparatus having the multiple functions of these devices. Note that the computer 101 and the device 102 may be any apparatuses as long as the apparatuses are connected to the common network 104 and have communication functions capable of communicating with each other. The router 103 has, for example, a DHCP (Dynamic Host Configuration Protocol) server function and can assign IP addresses to the computer 101 and the device 102. The network 104 is a communication network to which the computer 101, the device 102, and the router 103 are commonly connected, and includes a network controller in an example. The network 104 may be formed by, for example, one of the computer 101, the device 102, and the router 103. For example, the router 103 may have the function of the access point of a wireless LAN, and form the network 104 using the function, and the computer 101 and the device 102 may be connected, as stations of the wireless LAN, to the network 104. Note that the computer 101, the device 102, and the router 103 communicate with each other in accordance with the TCP/IP (Transmission Control Protocol/Internet Protocol) protocol. Note that the apparatuses such as the computer 101 and the device 102 connected to the network 104 can access an external network 105 via the router 103.

Apparatus Arrangement

Figure 2:
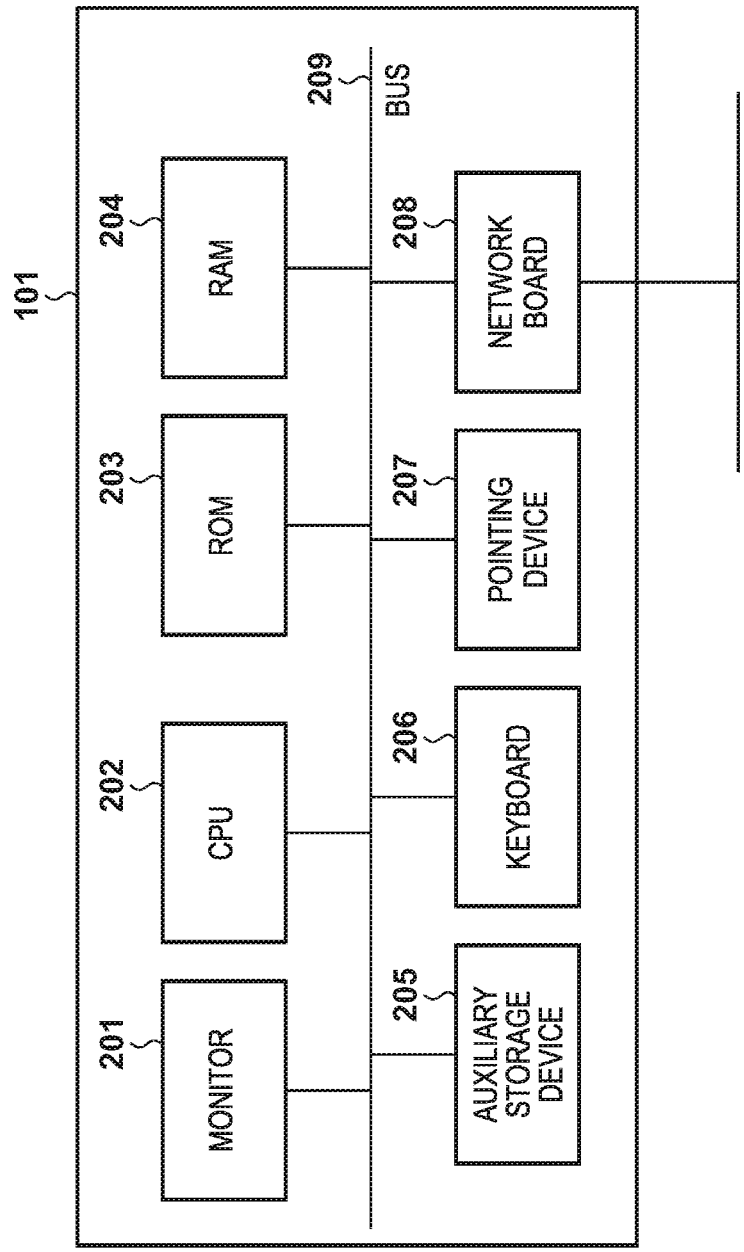
FIG. 2 is a block diagram showing an example of the arrangement of a computer.
Figure 3:
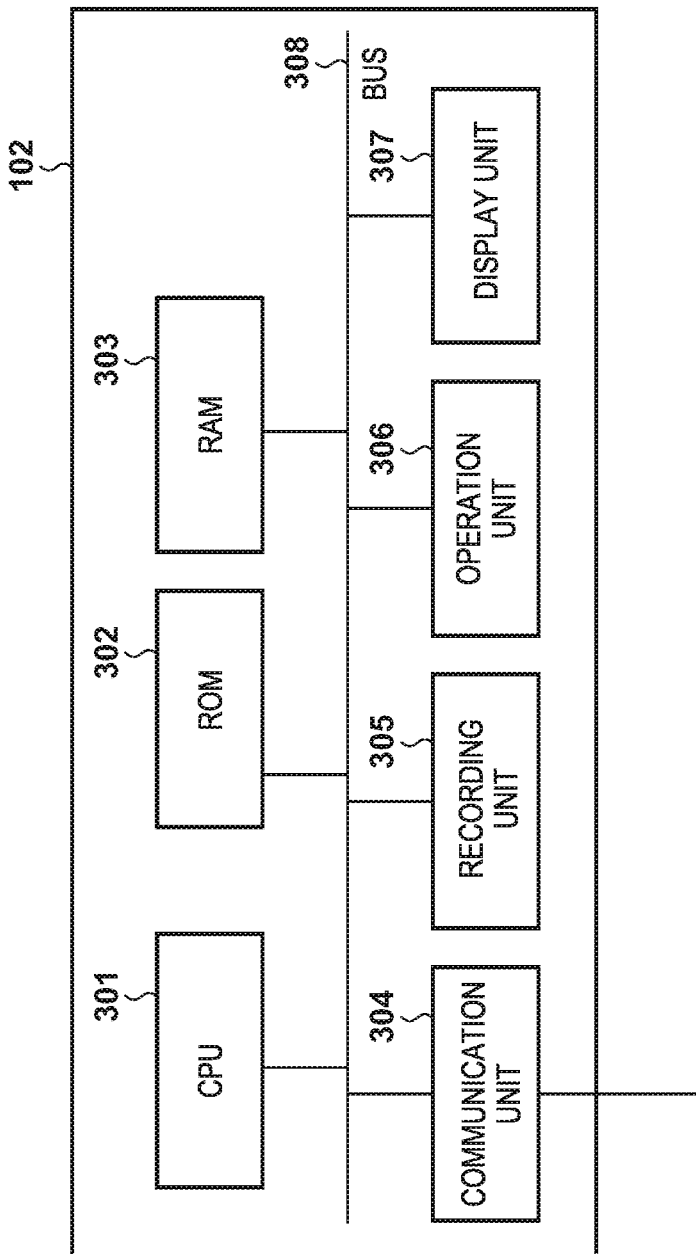
FIG. 3 is a block diagram showing an example of the arrangement of a device.

Examples of the arrangements of the computer 101 and the device 102 will be described with reference to FIGS. 2 and 3. FIG. 2 is a block diagram showing the example of the arrangement of the computer 101. FIG. 3 is a block diagram showing the example of the arrangement of the device 102. Note that the block diagrams of FIGS. 2 and 3 are merely examples. One or more blocks may be omitted or combined with other blocks, and other blocks may be added. Furthermore, each block may be replaced by another component having the same function. In some cases, the computer 101 or the device 102 need not include any blocks of the arrangement shown in FIG. 2 or 3.

In an example, the computer 101 includes a monitor 201, a CPU 202, a ROM 203, a RAM 204, an auxiliary storage device 205, a keyboard 206, a pointing device 207, and a network board 208. Note that these components are interconnected via a bus 209.

The monitor 201 is a display device and displays a UI of a driver or an application executed in the computer 101 (to be described later). Note that the monitor 201 can be incorporated in the computer 101 but a display device externally attached to the computer 101 may be used instead. In this case, for example, the monitor 201 can be replaced by a display control apparatus for controlling a display device such as an external display by transmitting, to the display device, a signal related to information to be displayed. FIG. 2 shows only the monitor 201 but a visual output function other than the monitor 201, such as an LED (Light Emitting Diode), may be used. In addition to or instead of the monitor 201, an arbitrary output device for presenting information to the user, such as a sound output device or vibration output device, may be used. The keyboard 206 and the pointing device 207 are input devices for inputting an instruction from the user. Note that the keyboard 206 and the pointing device 207 can be incorporated in the computer 101 but devices separate from the computer 101 may be used. If devices separate from the computer 101 are used as the keyboard 206 and the pointing device 207, these blocks can be replaced by an acceptance control unit for controlling input acceptance from an external apparatus. Alternatively, the keyboard 206 and the pointing device 207 may be replaced by another input acceptance device such as a pen input device. The keyboard 206 and the pointing device 207 may be formed, as one input/output control device for controlling acceptance of user input and presentation of information to the user, by a touch panel display or the like together with the monitor 201. The network board 208 is, for example, a device formed by a communication circuit for communicating with another apparatus such as the device 102 via the network 104 and the like. The computer 101 can perform, for example, control by accessing another apparatus such as the device 102 via the network board 208.

The CPU 202 is a central processing unit for controlling the computer 101 overall by executing programs stored in the ROM 203 and the auxiliary storage device 205. The CPU 202 can also execute programs such as a driver and an application (to be described later) stored in the ROM 203 and the auxiliary storage device 205. Note that the CPU 202 may be replaced by one or more arbitrary processors such as a microprocessor, an ASIC (Application Specific Integrated Circuit), an FPGA (Field Programmable Gate Array), and a DSP (Digital Signal Processor). The ROM 203 is a storage device storing basic software such as BIOS and various programs for causing the CPU 202 to execute processing (to be described later). The RAM 204 is a storage device that provides a storage area used by the CPU 202, when executing a program, to temporarily load and execute the program, and temporarily stores software programs such as an application and driver and data to be used by the software programs.

The auxiliary storage device 205 is a storage device such as a hard disk. The auxiliary storage device 205 stores software (programs) such as an OS (Operating System), applications, drivers, and various modules. The drivers stored in the auxiliary storage device 205 can include a device driver (scanner driver, printer driver, facsimile driver, or the like) for controlling the device 102. Furthermore, a display control driver for controlling display on the monitor 201, a keyboard driver for controlling the keyboard 206, and a pointing device driver for controlling the pointing device 207 can be stored in the auxiliary storage device 205. In addition, a network driver for controlling communication of the network board 208 can be stored in the auxiliary storage device 205.

Figure 4:
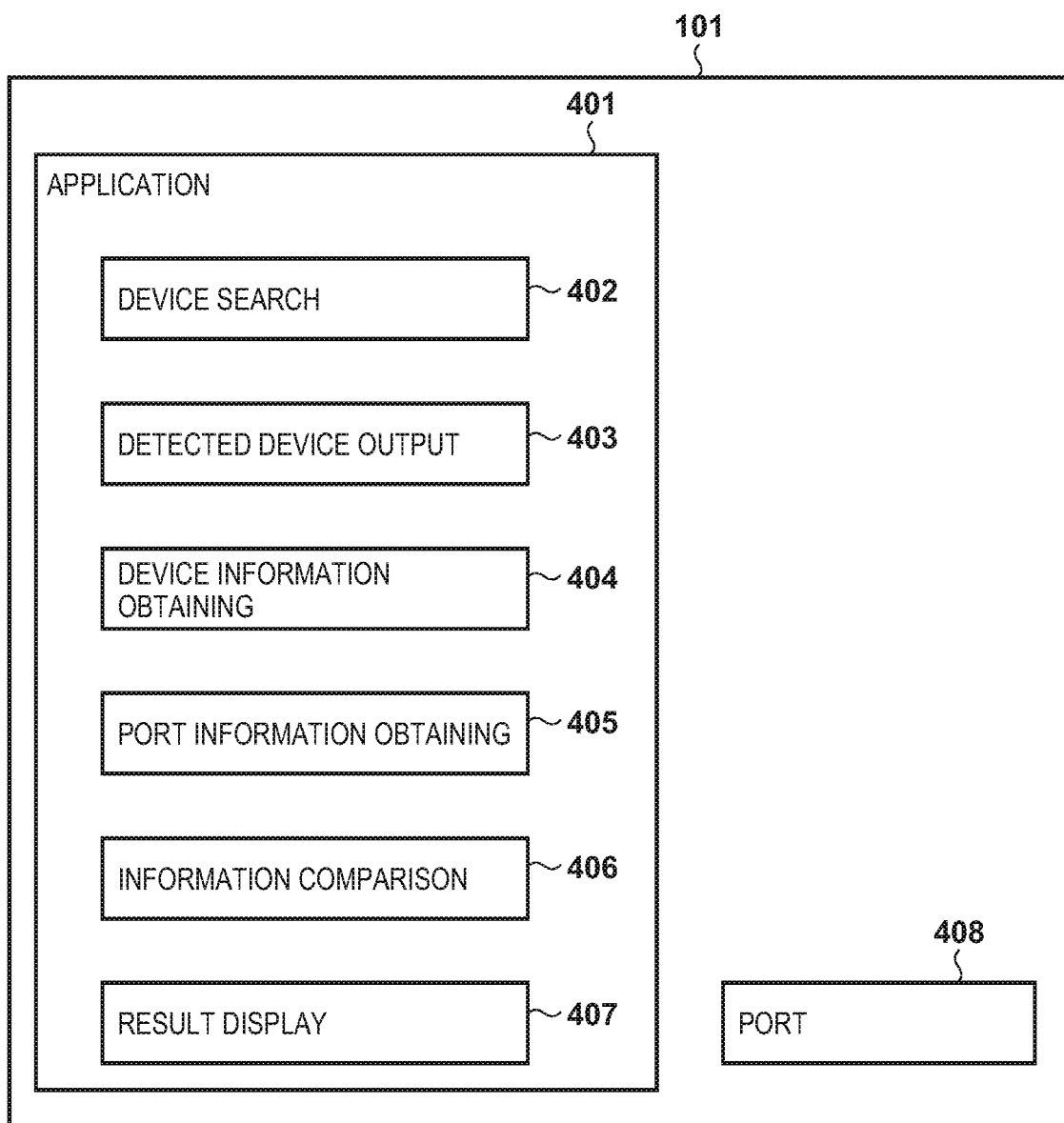
FIG. 4 is a block diagram showing an example of the functional arrangement of the computer.

The auxiliary storage device 205 can also store a program including codes for causing the CPU 202 to execute an application shown in FIG. 4 (to be described later). This application has a device search function by the TCP/IP protocol such as SNMP (Simple Network Management Protocol), and a function of setting information in another apparatus by the TCP/IP protocol. Note that the application may call a module having the search function and the information setting function, and cause the module to execute these functions. The search function and the information setting function may be provided in different modules.

In an example, the device 102 includes a CPU 301, a ROM 302, a RAM 303, a communication unit 304, a recording unit 305, an operation unit 306, and a display unit 307. Note that these components are interconnected via a bus 308.

The CPU 301 is, for example, a central processing unit for controlling the overall device 102 by loading programs stored in the ROM 302 into the RAM 303 and executing the loaded programs. Note that the CPU 301 may be replaced by one or more arbitrary processors such as a microprocessor, an ASIC (Application Specific Integrated Circuit), an FPGA (Field Programmable Gate Array), and a DSP (Digital Signal Processor). The ROM 302 is a storage device storing various programs including codes for causing the CPU 301 to execute processing to be executed in the device 102. The RAM 303 is a storage device that temporarily stores various data, and is used as, for example, a work area of the CPU 301. The communication unit 304 communicates with another device via the network. The recording unit 305 is, for example, a device for recording (printing) image data on a recording medium such as a paper sheet. The recording unit 305 has a general arrangement necessary to record information on the recording medium, such as a function of conveying the recording medium and a function of discharging ink. Note that if the device 102 is a device other than a printer, the device 102 can include another component for implementing a function required for the device 102 instead of or in addition to the recording unit 305. If, for example, the device 102 is a scanner, the device 102 can include a reading unit for reading an image arranged on a document table. The operation unit 306 is a device, such as buttons and a touch panel, having a function of accepting a user operation. The display unit 307 is a display device for displaying a UI screen for operating the device 102 and various kinds of information of the device 102. Note that the device 102 can include an output mechanism of an arbitrary combination of visual output, sound output, vibration output, and the like by a display and light source in order to present information to the user.

Functional blocks implemented when the CPU 202 of the computer 101 reads out, for example, an application 401 stored in the auxiliary storage device 205 and executes it will be described with reference to FIG. 4. As an example, the application 401 implements a series of functions, that is, a device search function 402, a detected device output function 403, a device information obtaining function 404, a port information obtaining function 405, an information comparison function 406, and a result display function 407. Note that a port 408 is a port corresponding to an apparatus (for example, the device 102) registered in the computer 101. Note that if there are a plurality of connection destination apparatuses, a plurality of ports 408 can be registered. Destination information set in each port will now be described. The destination information is set by, for example, two kinds of methods. The first method is a method of fixedly setting the IP address of the printer. The second method is a method using the function of a protocol and name resolution (a function of specifying an IP address based on a computer name, a domain name, and the like). Note that in the second method, even if the IP address of the printer is changed, the destination information is updated by tracking the change. On the other hand, in the first method, if the IP address of the printer is changed, the IP address is unwantedly different from the IP address set in the destination information of the printing port. Consequently, when the computer executes printing, print data may be transmitted to the IP address different from the IP address of the printer at this time, resulting in a failure in printing.

For example, the application 401 detects other devices connected to the network to which the computer 101 is connected, selectably displays a list of the detected devices on the monitor 201, and accepts device selection by the user. The application 401 obtains detailed information of the device selected by the user, and compares a predetermined element in the obtained information of the device with that in the setting information of the port 408 registered in the computer 101. The predetermined element can be at least one of, for example, information about the device such as an IP address, MAC address, or host name, and a port setting method. If it is determined that the information of the device does not match the setting information of the port 408, the application 401 displays a mismatch portion on the monitor 201. The functions shown in FIG. 4 sequentially execute these processes.

Figure 5A:
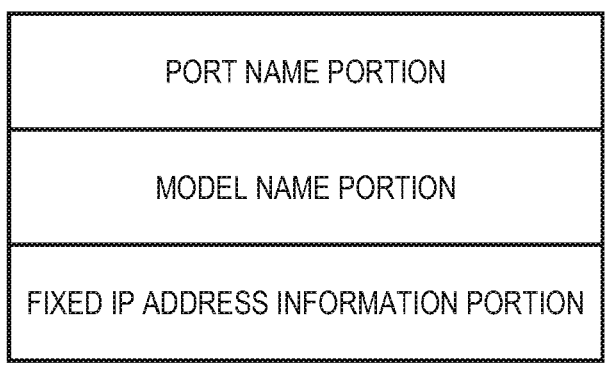
FIGS. 5A to 5C are tables each showing an example of setting information of a port.
Figure 5B:
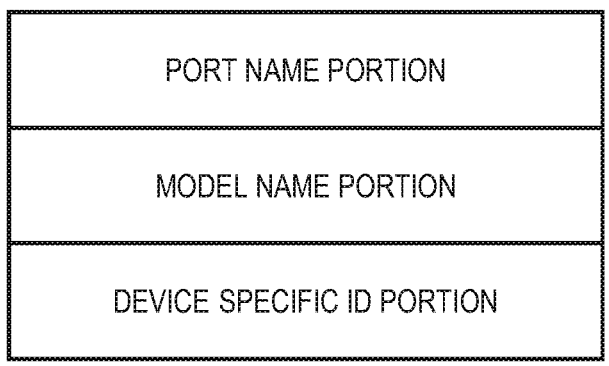
Figure 5C:
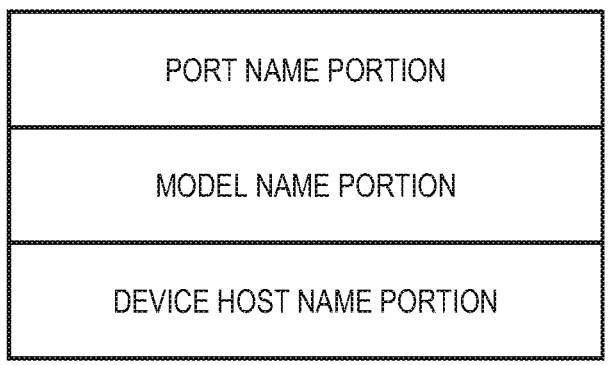

The device search function 402 searches for other devices connected to the network 104 to which the computer 101 is connected, and detects them. In this embodiment, the device search function 402 detects the device 102. The detected device output function 403 displays, on the monitor 201, a list of the devices detected by the device search function 402 in a user selectable form. After that, the device information obtaining function 404 waits for user selection of one or more specific devices from the list of other devices output by the detected device output function 403. In this state, the user selects a specific device from the list of the devices displayed on the monitor 201 using, for example, the pointing device 207. The device information obtaining function 404 obtains detailed network setting information about the specific device selected by the user. The port information obtaining function 405 obtains the setting information of the port 408 registered in the computer 101. FIGS. 5A to 5C each show examples of the elements of the setting information of the port 408. These pieces of information will be described in detail later when explaining processing examples. Note that the network setting information obtained by the device information obtaining function 404 includes information corresponding to at least some of the elements of the information shown in FIGS. 5A to 5C. The information comparison function 406 compares the network setting information obtained by the device information obtaining function 404 with the setting information of the port 408 obtained by the port information obtaining function 405, and determines whether these pieces of information match. Note that if it is determined that these pieces of information do not match, the information comparison function 406 specifies a mismatch point. The result display function 407 displays the specified mismatch point on the monitor 201. For example, an IPv4 address in the network setting information obtained by the device information obtaining function 404 is compared with a fixed IPv4 address in the setting information (a fixed IP address information portion of FIG. 5A) of the port 408. If these addresses do not match, the IPv4 address in the network setting information and the fixed IP address set in the port 408 are displayed. Note that if there is no mismatch point, the result display function 407 displays information indicating that there is a printing enable port. If there is no setting information of the port 408 associated with the information selected by the user, the result display function 407 presents information indicating that there is no port. Note that the result display function 407 can present information by turning on or flickering an LED or the like or by a sound, a vibration, or the like, instead of or in addition to screen display.

Examples of Display Screen

Figure 7A:
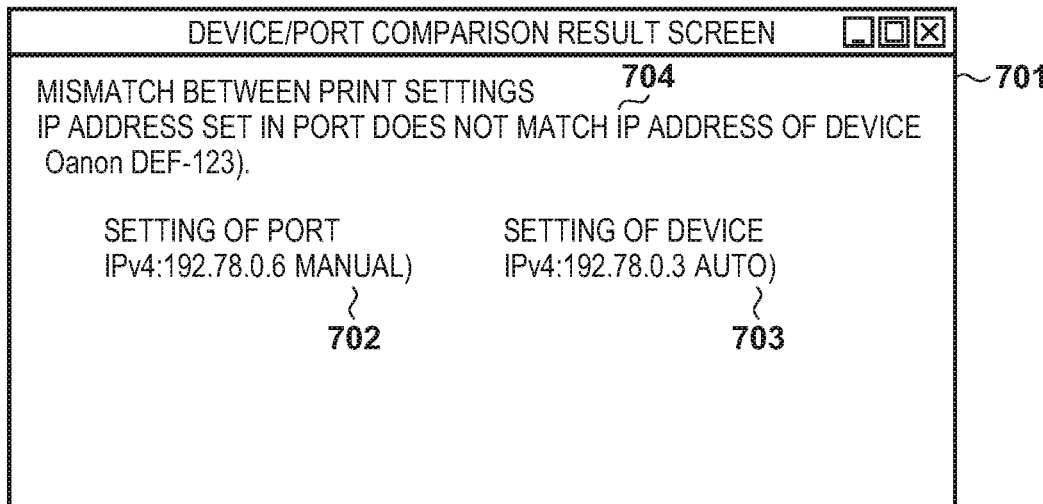
FIGS. 7A to 7C are views each showing an example of a UI screen.
Figure 7B:
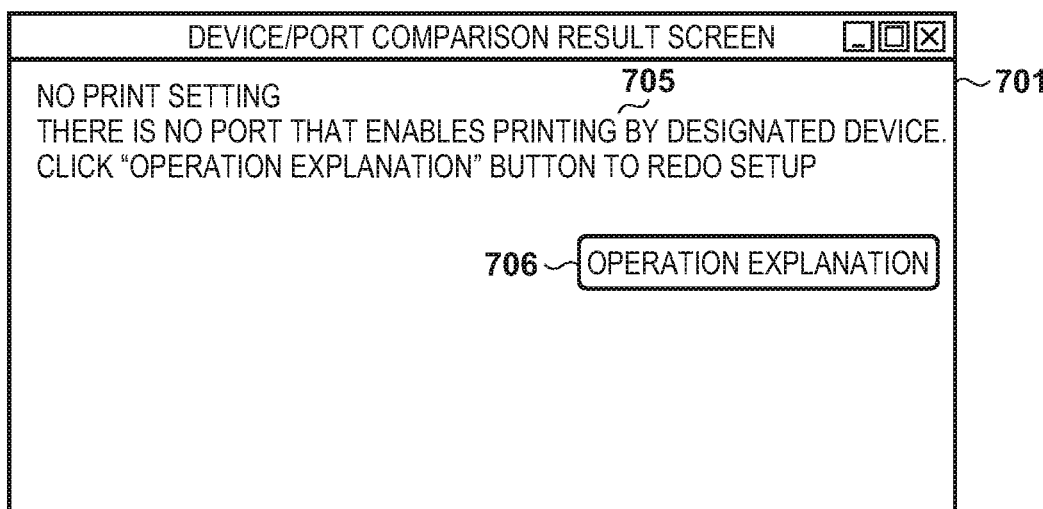
Figure 7C:
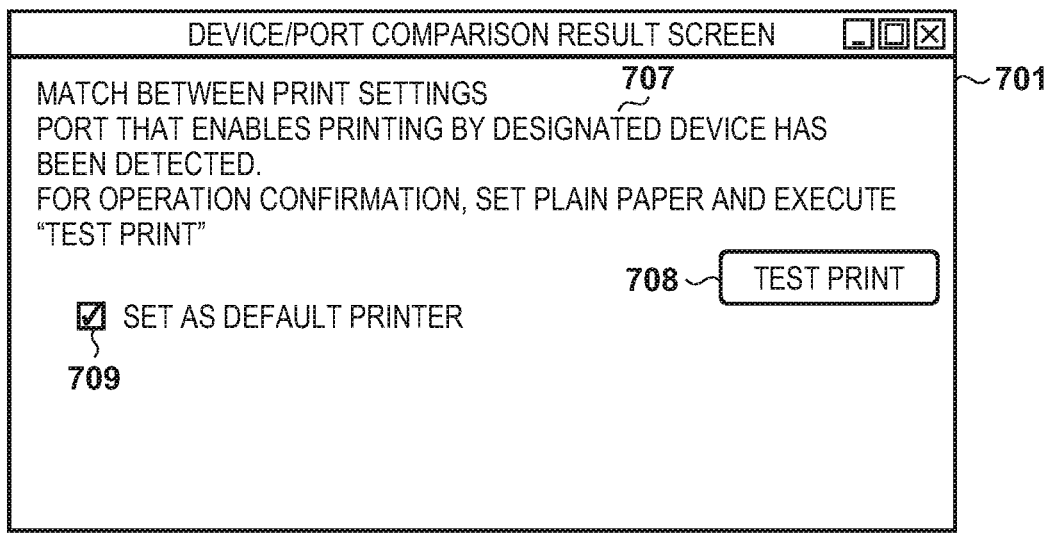

FIGS. 6 and 7A to 7C are views each showing an example of a UI screen generated by the application 401. When the application 401 is executed, a screen 601 shown in FIG. 6 is displayed. When the user presses a search start button 602 in the selection screen 601 shown in FIG. 6, other devices connected to the network 104 are detected and a list 603 of product names and the like (identification information) of the detected devices is displayed. When the user selects one of the detected devices and presses a port confirmation button 604, information of the detected device is compared with setting information of a registered port, thereby displaying one of screens shown in FIGS. 7A to 7C. FIG. 7A shows an example of a UI screen displayed when it is determined that a comparison result indicates a mismatch. FIG. 7B shows an example of a UI screen displayed when the port 408 that enables printing by the device designated by the user is not registered in the computer 101. FIG. 7C shows an example of a UI screen displayed when it is determined that a comparison result indicates a match.

Procedure of Processing

Some examples of the procedure of processing executed by the computer 101 will be described below. Note that processing examples to be individually described below may be used singly or in combination.

Note that processing to be explained below is implemented when, for example, the CPU 202 loads, into the RAM 204, a program stored in the auxiliary storage device 205 and corresponding to the application 401, and executes it. Assume that the device 102 can switch enabling/disabling of an IP address automatic assignment function (DHCP or the like). The device 102 supports the TCP/IP protocol, and can use the function of the protocol and name resolution (the function of specifying an IP address based on a computer name, a domain name, and the like) for, for example, setting of connection to another device. The function of the protocol can be, for example, a WSD (WebService on Devices) protocol as the standard protocol of the Windows® OS. As one of the functions of the WSD protocol, the WS-Discovery function may be used. The WS-Discovery function can detect a device connected to the network based on an identifier (UUID (Universally Unique Identifier)) for uniquely identifying each device. For name resolution, for example, the DNS (Domain Name System) function for managing the correspondence between an IP address and a domain name can be used. If there is no DNS function in the network, an LLMNR (Link-Local Multicast Name Resolution) function capable of attaining name resolution of a neighboring network device may be used. Note that enabling/disabling of each of the WSD function, LLMNR function, and DNS function of the device 102 can be switched when the user directly operates the device 102. A UUID is set in the device 102, and the UUID version is assumed to be "1" in which a UUID is formed by the MAC address of the device 102 and UUID generation time.

First Processing Example

The first processing example will be described first. Note that in this processing example, the one port 408 for the device 102 is set in the computer 101, and the setting information of the port 408 is registered in the format shown in FIG. 5A. In this case, among the elements shown in FIG. 5A, a port name portion includes the name of the port, in which a character string "IP_xxx.xxx.xxx.xxx" is set as a port name in this example. Note that the port name portion includes, after "IP_", the IP address of the device 102 at the time of port generation. In a model name portion, the name of the device 102 is set. In a fixed IP address information portion, the IP address of the device 102 at the time of port generation is set. That is, in this example, the character string after "IP_" in the port name portion matches the IP address set in the fixed IP address information portion.

The procedure of the processing in this example will be described with reference to FIG. 8.

When the application 401 is activated by a user operation, the screen 601 shown in FIG. 6 is displayed on the monitor 201. When the search start button 602 of the screen 601 is pressed by a user operation, the device search function 402 starts to search for and detect another device connected to the network 104 (step S801). If the device search function 402 detects a device, the detected device output function 403 adds information of the detected device to the list 603, and outputs it to the monitor 201. After that, the application 401 accepts user selection of a specific device from other devices included in the list 603 (step S802). If the user presses the port confirmation button 604 in this state, the device information obtaining function 404 obtains the network setting information of the specific device (to be referred to as a "user designated device" hereinafter) selected by the user. The port information obtaining function 405 obtains the setting information (the information shown in FIG. 5A in this example) of the port 408 registered in the computer 101. If the network setting information about the user designated device and the setting information of the port 408 are obtained, the information comparison function 406 compares these pieces of information (step S803).

Figure 9:
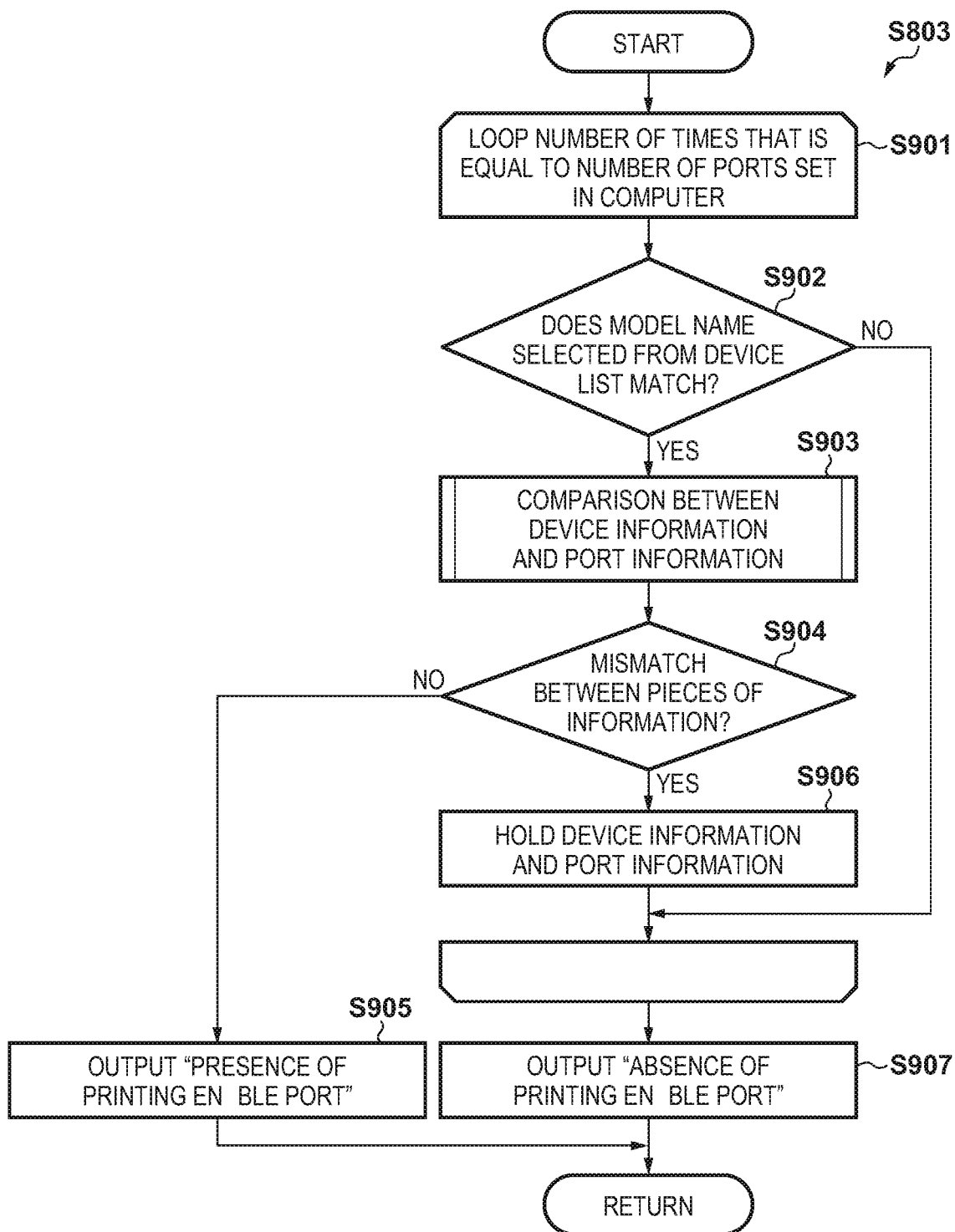
FIG. 9 is a flowchart illustrating an example of the procedure of comparison processing.

The processing in step S803 will now be described with reference to FIG. 9. Referring to FIG. 9, the information comparison function 406 repeats processes in steps S902 to S906 (to be described below) the number of times that is equal to the number of ports 408 obtained by the port information obtaining function 405 (step S901). In this repetitive processing, the information comparison function 406 detects the port 408 for which the same model name as that of the user designated device is registered (step S902). If the model name of the user designated device does not match the model name (the setting value of the model name portion in each of FIGS. 5A to 5C) set in the port 408 (NO in step S902), the process shifts to processing associated with another port 408 without performing the processes in step S903 to S906. On the other hand, if the model name of the user designated device matches the model name set in the port 408 (YES in step S902), the information comparison function 406 compares the network setting information of the user designated device with that of the port 408 (step S903). Details of the comparison processing will be described later. In the processing of step S903, a determination result of "match" or "mismatch" is output in accordance with whether the network setting information of the user designated device matches that of the port 408. If the determination result in step S903 is "match" (NO in step S904), the information comparison function 406 ends the repetitive processing (step S901). Since the port that enables printing by the user designated device is registered in the computer 101, the information comparison function 406 outputs a determination result indicating "presence of printing enable port" (step S905). On the other hand, if the determination result in step S903 is "mismatch" (YES in step S904), the information comparison function 406 holds the information of the user designated device and the information of the port 408 including the matching model name in order to display the information shown in FIG. 7A (step S906). The information comparison function 406 then shifts to processing associated with another port 408. Note that a plurality of different ports 408 with the same model name may be registered. In this case, if information of one of the ports 408 matches the network setting information of the user designated device, it is determined in step S903 that the pieces of information match and a determination result indicating "presence of printing enable port" is output (step S905). On the other hand, if it is determined that the model names and the pieces of network setting information of all the ports 408 do not match those of the user designated device, the information comparison function 406 outputs a determination result indicating "absence of printing enable port" (step S907).

Referring back to FIG. 8, if the determination result of the processing of FIG. 9 (the processing in step S803) indicates "absence of printing enable port" (NO in step S804), the information comparison function 406 determines whether one or more pieces of information have been held in step S906 (step S805). That is, if there is the port 408 including setting information of the same model name as that of the user designated device, the information is held in step S906. Therefore, in step S805, it is determined whether the pieces of network setting information do not match or there is no port by determining whether one or more pieces of information have been held in step S906. If it is determined that information has been held in step S906 (YES in step S805), the result display function 407 displays a screen indicating that the network setting information is different between the user designated device and the port 408 (step S806). FIG. 7A shows an example of the screen displayed at this time. On the other hand, if it is determined that no information has been held in step S906 (NO in step S805), the result display function 407 displays a screen indicating that there is no port 408 corresponding to the user designated device (step S807). FIG. 7B shows an example of the screen displayed at this time. If the determination result of the processing in step S803 indicates "presence of printing enable port" (YES in step S804), the result display function 407 displays a screen indicating that the network setting information of the user designated device matches the setting information of the registered port 408 (step S808). FIG. 7C shows an example of the screen displayed at this time.

In an example, in FIG. 7A, setting information 702 of the port 408 and setting information 703 of the user designated device are displayed and guidance 704 indicating that these pieces of information do not match is presented. The example of FIG. 7A shows that an IPv4 address "192.78.0.6" is manually (fixedly) assigned to the port 408 and an IPv4 address "192.78.0.3" is automatically assigned to the user designated device. Note that the setting information 702 shows the IPv4 address set in the port 408 with the matching model name information in the loop of the processing in FIG. 9. The setting information 703 shows the IPv4 address extracted from the information concerning the user designated device, that has been obtained when searching for a device connected to the network in step S801. Based on the information shown in FIG. 7A, the user can recognize that the IPv4 address of the user designated device does not match the IPv4 address assigned to the port 408, and know that the setting of the port 408 should be changed. Note that the example of FIG. 7A shows a case in which the IPv4 addresses are different. However, if there is a mismatch element other than the IPv4 address, which is a factor that disables printing by the user designated device, the mismatch element is presented. This allows the user to know an inappropriate item of the settings of the port 408. As will be described later, as another example of the mismatch element, there is a case in which the IPv4 address is fixedly assigned to the port 408 and an IP address automatic assignment function such as DHCP is enabled in the device 102.

In an example, in FIG. 7B, guidance 705 indicating that the port corresponding to the user designated device cannot be detected and an operation explanation button 706 are displayed. From the screen shown in FIG. 7B, the user can know that the port has not been set with respect to the designated device. The operation explanation button 706 is a button for displaying, when pressed by the user, guidance to install a driver corresponding to the user designated device. When the user installs the driver in accordance with the guidance displayed after the pressing of the operation explanation button 706, the port 408 corresponding to the user designated device is generated in the computer 101. Note that if the operation explanation button 706 is displayed, for example, a screen for downloading the printer driver for which a Web browser is activated may be displayed. At this time, a screen on which a list of devices is displayed may be displayed or a screen for downloading the driver corresponding to the device selected in FIG. 6 may be displayed. Then, printing by the user designated device from the computer 101 is enabled. Note that the guidance 705 includes text for proposing pressing the operation explanation button 706. Note that FIG. 7B shows an example, and the guidance may be displayed on the screen shown in FIG. 7B instead of displaying the guidance when the operation explanation button 706 is pressed. In this case, the operation explanation button 706 may be omitted, and a driver install button may be displayed instead.

In an example, in FIG. 7C, guidance 707 indicating that the port which enables printing by the user designated device has been detected and a test print button 708 are displayed. From the screen shown in FIG. 7C, the user can know that the appropriate port 408 corresponding to the user designated device is registered in the computer 101. The test print button 708 is a button for making it possible to confirm, when pressed by the user, whether print data can be sent to the user designated device. Note that the guidance 707 includes guidance concerning test printing for such operation confirmation. In FIG. 7C, the screen includes a checkbox 709 for setting, as a port normally used when executing printing from the computer 101, the port 408 which corresponds to the user designated device and whose setting information matches that of the user designated device. For example, if the user checks the checkbox 709 and closes the application 401, the port 408 corresponding to the user designated device is set as a port normally used when executing printing from the computer 101. On the other hand, if the user closes the application 401 without checking the checkbox 709, the port 408 is not set as a port normally used when executing printing from the computer 101.

As described above, in this embodiment, the computer 101 searches for devices connected to the network to which the computer is currently connected, prompts the user to designate a specific device from the detected devices, and confirms whether a port corresponding to the user designated device is set in the computer 101. This makes it possible to present the information shown in FIG. 7B with respect to the user designated device whose corresponding port is not set in the computer 101. If the port corresponding to the user designated device is set, the computer 101 can notify the user whether the setting information matches the current setting information of the user designated device and notify, if the pieces of information do not match, the user of a mismatch point. This can present information about a printer for which there is no port information since, for example, the user has erroneously deleted a driver, and also present, if there is port information, information indicating whether the setting value is appropriate.

Subsequently, an example of the procedure of the comparison processing between the setting information of the user designated device and that of the port in step S903 will be described with reference to FIG. 10. The information comparison function 406 confirms whether a method of setting the destination information of the port 408 is a method (to be referred to as a "fixed setting method" hereinafter) of fixedly assigning an IP address (step S1001). The information comparison function 406 performs this determination processing in accordance with, for example, whether the port name portion of the port 408 includes an arbitrary IP address. For example, if the port name portion includes an arbitrary IP address, it is determined that the destination information setting method is the fixed setting method; otherwise, it is determined that the method is not the fixed setting method. If the setting method of the port 408 is not the fixed setting method (NO in step S1001), the information comparison function 406 determines that the setting method of the port 408 is a method (to be referred to as an "automatic tracking method" hereinafter) of automatically setting an IP address, and advances the process to step S1002. Step S1002 is determination processing when the setting method of the port of the computer 101 is the automatic tracking method, and an example of a detailed processing procedure will be described later with reference to FIG. 11. On the other hand, if the setting method of the port 408 is the fixed setting method (YES in step S1001), the information comparison function 406 compares the IP address of the user designated device obtained in step S801 with the IP address fixedly assigned to the port 408 (step S1003). If these IP addresses do not match (NO in step S1004), the information comparison function 406 determines that the pieces of setting information do not match (step S1007), and advances the process to step S904 of FIG. 9; otherwise (YES in step S1004), the information comparison function 406 determines whether the IP address automatic assignment function such as DHCP is enabled in the device 102 (step S1005). Note that the device information obtaining function 404 obtains information indicating whether the automatic assignment function such as DHCP is enabled. Note that information used for the comparison processing, which includes the information indicating whether the automatic assignment function such as DHCP is enabled, need only be obtained before the comparison processing. For example, these pieces of information may be obtained in step S801 or S1003. If it is determined whether the IP address automatic assignment function of the device 102 is disabled (NO in step S1005), the information comparison function 406 determines that the setting information of the device 102 matches that of the port 408 corresponding to the device 102 (step S1006); otherwise (YES in step S1005), the information comparison function 406 determines that the setting information of the device 102 does not match that of the corresponding port 408 (step S1007). After that, the information comparison function 406 advances the process to step S904 of FIG. 9.

If, for example, the router 103 has a DHCP server function, the IP address of the device 102 can be changed by reassignment. Therefore, if the computer 101 fixedly sets the port 408 for the device 102, the IP address of the device 102 at the time of this setting operation may be different from that when executing printing later. To cope with this, in the processing shown in FIG. 10, when the IP address of the port 408 corresponding to the device 102 is fixedly assigned, the computer 101 confirms whether the IP address automatic assignment function is enabled in the device 102. If it is determined that the IP address automatic assignment function is enabled in the device 102, the computer 101 determines that the setting information of the port 408 does not match that of the device 102. This can notify the user that even if the IP address fixedly set in the port 408 matches the IP address automatically set in the device 102, the IP addresses do not match when the IP address of the device 102 is automatically changed later. That is, in this case, in the guidance 704 of FIG. 7A, a message indicating that the fixed IP address is set in the port and the automatic tracking method is set in the device is displayed. This notification allows the user to recognize that he/she can execute printing at this time but may not be able to execute printing later.

The determination processing in step S1002 when the setting method of the port of the computer 101 is the automatic tracking method will be described with reference to FIG. 11. Since the port 408 corresponding to the device 102 is set in the computer 101 by the automatic tracking method, the information is registered in the format shown in FIG. 5B or 5C. Assume that among the elements of the format shown in FIG. 5B, a character string "WSD-xxxxxxxx-xxxx-xxxx-xxxx-xxxxxxxxxxxx.xxxx" is set in a "port name portion". Note that a portion of "x" of the character string of the port name portion is assigned with an arbitrary hexadecimal digit. Assume also that the UUID of the device is set in a "device-specific ID portion". Furthermore, assume that among the elements of the format shown in FIG. 5C, the host name of the device is set in a "port name portion" and a "device host name portion".

Figure 11:
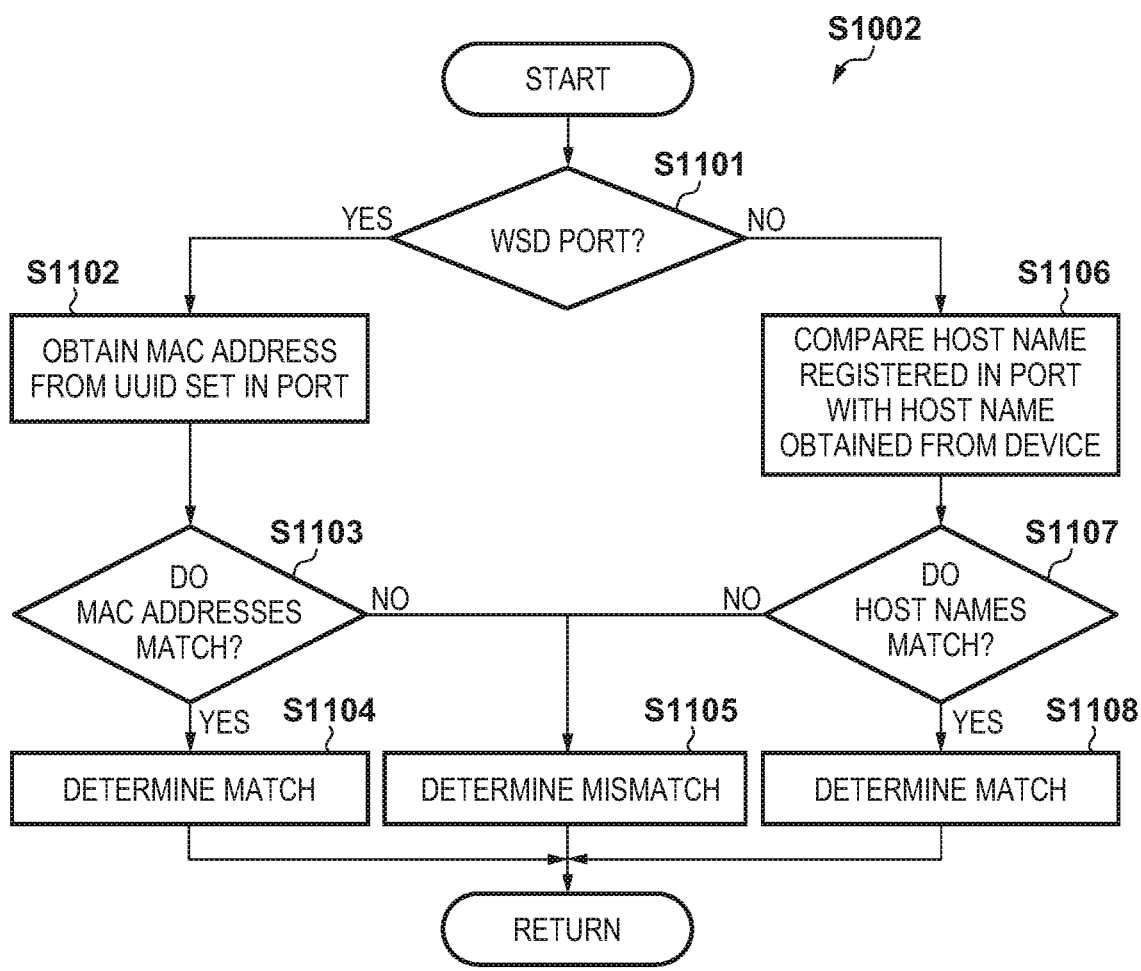
FIG. 11 is a flowchart illustrating an example of the procedure of the comparison determination processing.

Referring to FIG. 11, the information comparison function 406 confirms whether the type of the automatic tracking function of the setting of the port 408 is WSD (step S1101). Note that a port which is set by WSD will be referred to as a WSD port hereinafter. If the port 408 is a WSD port (YES in step S1101), the information comparison function 406 obtains the MAC address of the device 102 from the UUID (the "device-specific ID portion" in FIG. 5B) in the setting information of the port (step S1102). The information comparison function 406 compares the MAC address obtained in step S1102 with the MAC address of the device 102 obtained in step S801 (step S1103). If it is determined that the MAC addresses match (YES in step S1103), the information comparison function 406 determines that the setting information of the port 408 matches that of the device 102 (step S1104), and advances the process to step S904 of FIG. 9; otherwise (NO in step S1103), the information comparison function 406 determines that the setting information of the port 408 does not match that of the device 102 (step S1105), and advances the process to step S904 of FIG. 9. If it is determined in step S1101 that the port 408 is not a WSD port (NO in step S1101), the information comparison function 406 advances the process to step S1106. In step S1106, the information comparison function 406 compares the host name ("port name portion" or "device host name portion" in FIG. 5C) in the setting information of the port with the host name of the device 102 obtained in step S801. If the host names match (YES in step S1107), the information comparison function 406 determines that the setting information of the port 408 matches that of the device 102 (step S1108), and advances the process to step S904 of FIG. 9; otherwise (NO in step S1107), the information comparison function 406 determines that the setting information of the port 408 does not match that of the device 102 (step S1105), and advances the process to step S904 of FIG. 9.

Assume, for example, that the computer 101 and two devices A and B of the same model (that is, the same model name) are connected to one network, and a WSD port associated with device A is generated in the computer 101.

In this case, if the user activates the application 401 and presses the search start button 602 in an environment in which only device B is active, the computer 101 detects device B, adds device B to the list 603, and displays it on the monitor 201. At this time, if the user selects device B from the list 603, and presses the port confirmation button 604, the model name matches that of device A (YES in step S902), and the port is set by the automatic tracking method (NO in step S1001), thereby performing the processing shown in FIG. 11. Then, the information comparison function 406 determines that the MAC address of device B does not match the MAC address based on the setting information of the port of device A (NO in step S1103). The information comparison function 406 determines that the setting information of the port does not match that of device B (step S1105). As a result, the result display function 407 displays, for example, "MAC address set in port does not match MAC address of device" in the guidance 704 of the UI screen shown in FIG. 7A. This allows the user to recognize that printing cannot be performed by device B selected from the list 603. Furthermore, the result display function 407 may display the MAC addresses in the setting information 702 of the port and the setting information 703 of the device. In addition, by adding a supplementary sentence such as "is there device other than device selected from list?" to the guidance 704, it is possible to give the user an opportunity of recognizing that device A is not active. After that, the user can activate device A and compare the MAC address of device A with the MAC address displayed in the setting information 702 of the port, thereby recognizing that printing by device A from the computer 101 is possible. Note that the user may cause the computer 101 to execute the application 401 again after the activation of device A, or determine whether printing by device A is possible by visually perceiving information of device A to confirm it. This allows the user to avoid installing the driver of device B of the same model name without intention. Note that even if the port is not a WSD port, it is possible to obtain the same effect.

Note that the above example has explained a case in which the device information and the port information are obtained before information comparison. However, the device information and the port information may be obtained during information comparison. Furthermore, the above example has explained a case in which IPv4 addresses are used as IP addresses. However, IPv6 addresses may be used. In this case, if the device 102 supports setting of a plurality of kinds of IPv6 addresses such as a link-local address, stateless addresses 1 to 8, and a stateful address, all the kinds of IPv6 addresses set in the device 102 can be obtained. In step S1004 of FIG. 10, all the kinds of IPv6 addresses set in the device 102 can be compared with a fixed IPv6 address set in the port 408.

Figure 10:
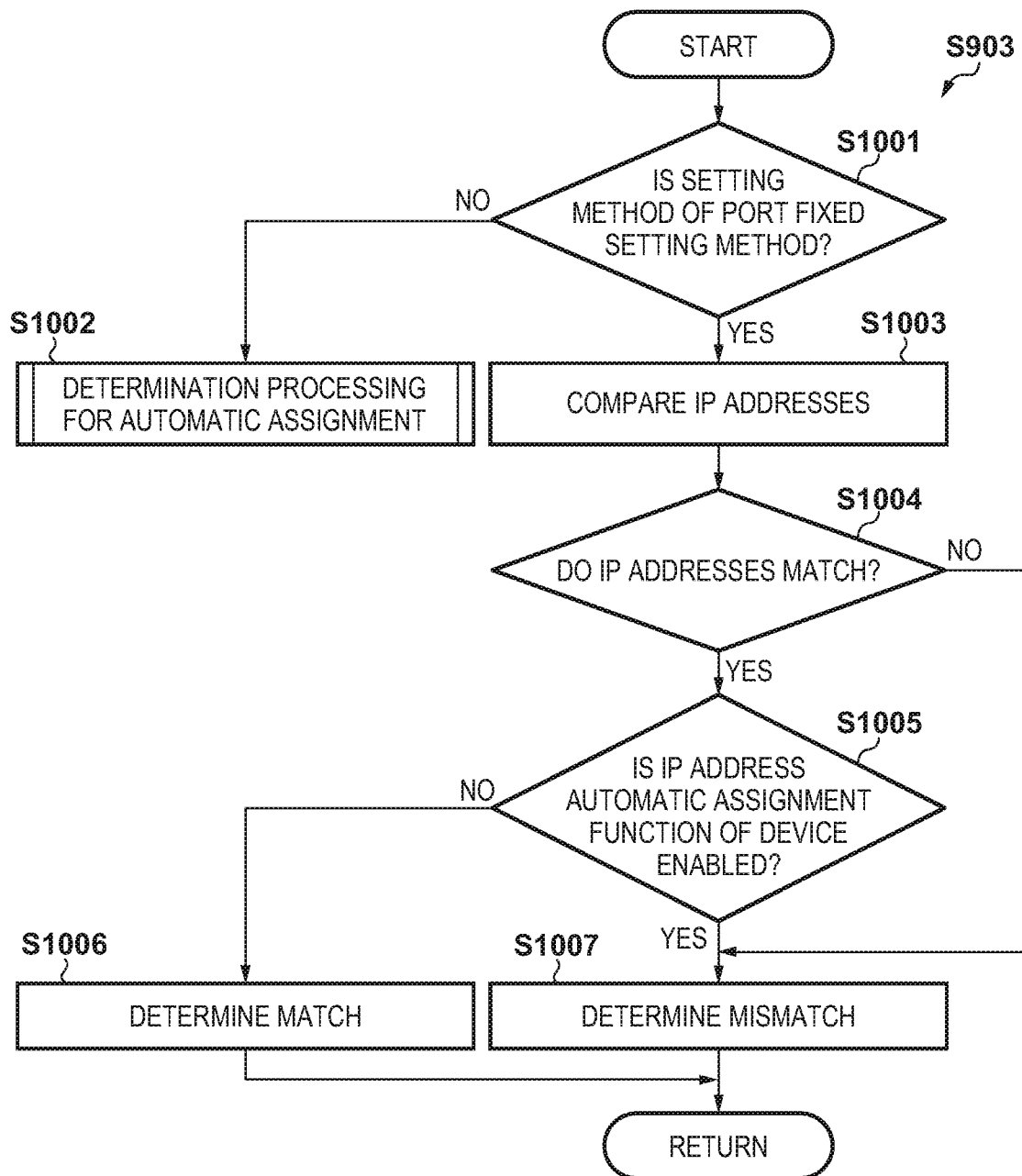
FIG. 10 is a flowchart illustrating an example of the procedure of comparison determination processing.

In the above example, it is determined in step S1005 of FIG. 10 whether the IP address automatic assignment function of the device 102 is enabled or disabled. However, this determination processing need not be performed. In this case, if it is determined that the IP address of the device 102 matches that of the port 408, it can be determined that the setting information of the device 102 matches that of the port 408. This can prevent unnecessary determination from being performed if the router 103 has no DHCP server function or the user intentionally disables the DHCP server function.

A case in which the information stored in the "device-specific ID portion" of FIG. 5B is a UUID has been explained above. However, another identifier that can uniquely identify the device, such as a MAC address or a UUID of a version other than version 1, may be used.

In FIG. 7A showing the screen displayed when the pieces of setting information do not match, the operation explanation button 706 shown in FIG. 7B may be provided and guidance to install the driver corresponding to the user designated device may be displayed to the user. An example in which the screen shown in FIG. 7C includes both the test print button 708 and the checkbox 709 has been described above. However, configuration may be such that only one of the button and the checkbox is displayed or none of them is displayed.

The above example has explained a case in which only one piece of information is held in step S906 of FIG. 9. However, a plurality of pieces of information can be held. If a plurality of pieces of information are held, one of the pieces of information is automatically selected or a plurality of ports respectively corresponding to the plurality of held pieces of information are displayed and selection by the user is accepted, thereby displaying the selected information, as shown in FIG. 7A. If a plurality of ports are set, a screen for accepting port selection by the user may be displayed in step S901, and user selection associated with a processing target port may be accepted. Note that if no port is set, the computer 101 may display information indicating that there is no printing port.

In the above example, it is determined in step S1001 of FIG. 10 whether the port is set by the fixed setting method by confirming whether the "port name portion" in the setting information of the port 408 includes an arbitrary IP address. However, the present invention is not limited to this. For example, the setting method of the port may be determined in accordance with whether information capable of specifying that the fixed setting method is used, such as "IPv4 Port", is set in the port name portion. In the above example, the port information obtaining function 405 obtains the IP address from the "fixed IP address information portion" in the setting information of the port 408. However, the present invention is not limited to this. For example, if the "port name portion" in the setting information of the port 408 includes the IP address of the device 102, the IP address may be obtained from contents of the port name portion. The same applies to a case in which the setting information of the port 408 is in the format shown in FIG. 5C. That is, if the host name of the device is set in the "port name portion" and "device host name portion", the host name can be obtained from the port name portion.

In the above example, the type of the automatic tracking function of the port 408 is determined in step S1101 of FIG. 11. However, this determination processing may be performed in accordance with, for example, whether the "port name portion" in the setting information of the port 408 includes an arbitrary IP address. If a name, such as "WSD_Port", indicating that the port 408 is a WSD port is set in the port name portion, the determination processing in step S1101 may be performed based on contents of the port name portion. The above example has explained a case in which WSD is used as the automatic tracking method associated with setting of the setting information of the port. However, another protocol having the same function as that of WSD may be used. The above example has exemplified LLMNR and DNS as examples of the automatic tracking method. However, another protocol having a name resolution function may be used.

Second Processing Example

In the processing example, processing will be described in which if the automatic tracking function is set in the port 408 registered in the computer 101, it is confirmed whether the function can be actually used and it is determined whether the setting information of the port matches that of the device. Note that in this processing example as well, the WSD function is used as the automatic tracking function and the LLMNR and DNS functions are used as the name resolution functions based on the host name of the device. Note also that the setting information of the port 408 corresponding to the device 102 is registered in the computer 101 in the format shown in FIG. 5B or 5C. Note that the router 103 supports the DNS function, and the user can switch enabling/disabling of the DNS function by an operation from the computer 101.

Figure 12:
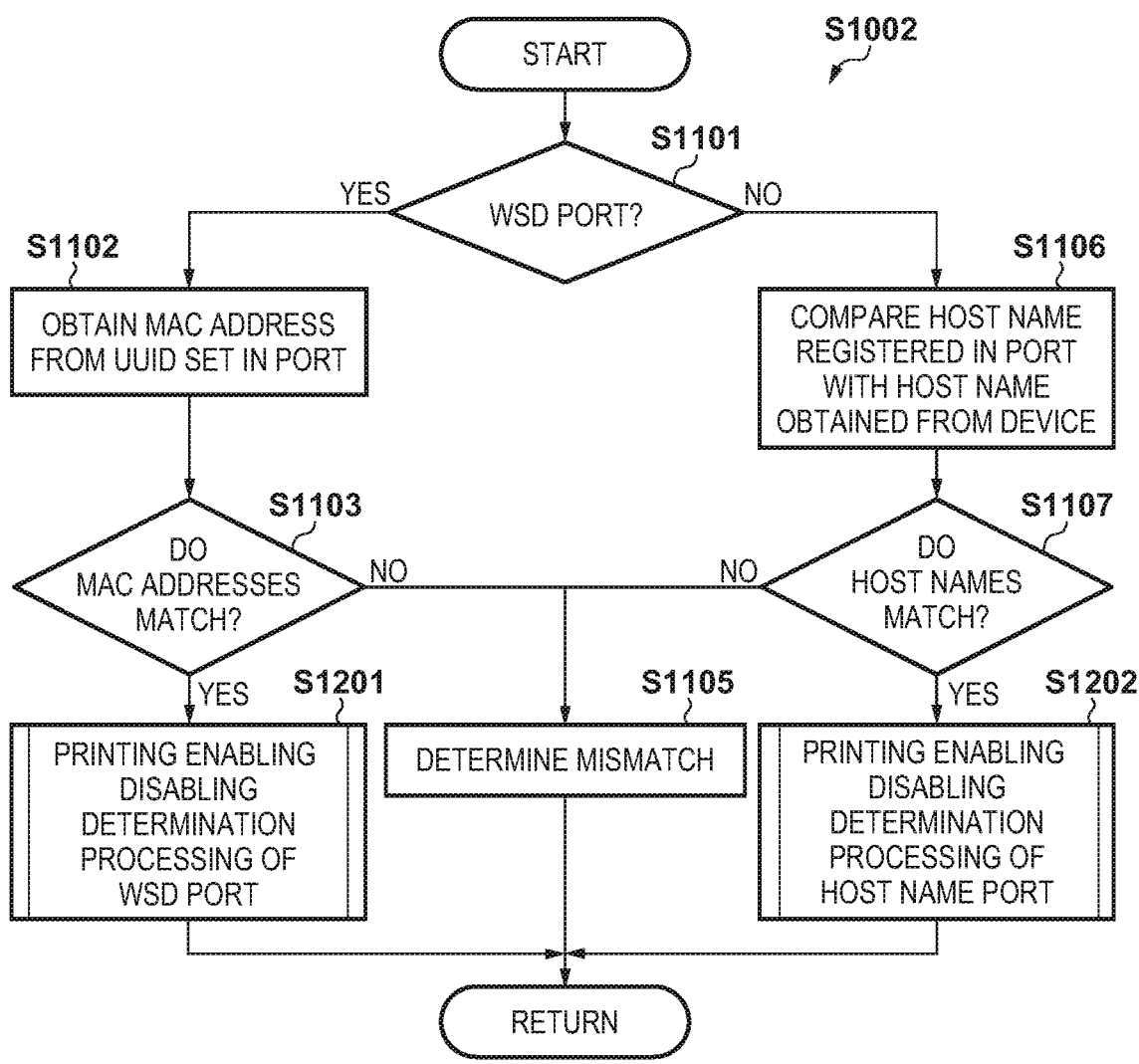
FIG. 12 is a flowchart illustrating another example of the procedure of the comparison determination processing.

In this processing example, instead of the processing shown in FIG. 11, processing shown in FIG. 12 is executed. Note that in FIG. 12, the same reference symbols as in FIG. 11 denote steps in which the same processes as those in FIG. 11 are executed and a description thereof will be omitted. Referring to FIG. 12, if it is determined in step S1103 that the MAC address in the setting information of the port 408 matches the MAC address of the device 102 (YES in step S1103), the information comparison function 406 performs printing enabling/disabling determination processing of the WSD port (step S1201). If it is determined in step S1107 that the host name in the setting information of the port 408 matches the host name of the device 102 (YES in step S1107), the information comparison function 406 performs printing enabling/disabling determination processing of the host name port (step S1202).

Figure 13:
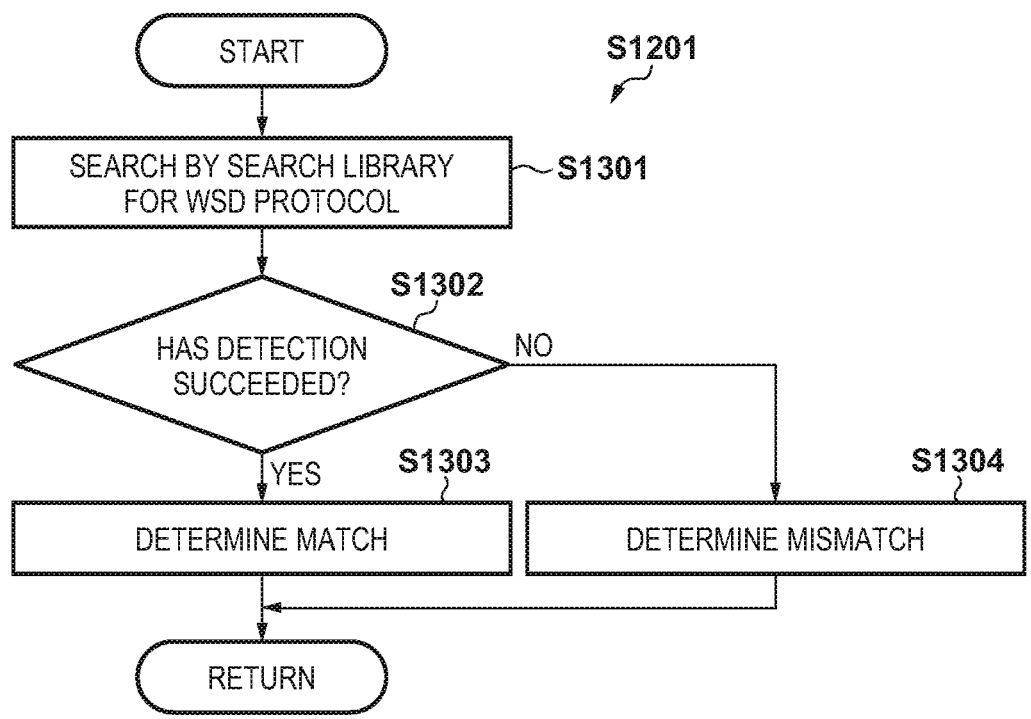
FIG. 13 is a flowchart illustrating an example of the procedure of printing enabling/disabling determination processing.

The printing enabling/disabling determination processing (step S1201) of the WSD port will be described with reference to FIG. 13. Referring to FIG. 13, the information comparison function 406 searches for the device 102 by unicast communication using a search module supporting the WSD protocol (step S1301), and determines whether detection has succeeded (step S1302). If detection of the device 102 has succeeded (YES in step S1302), the information comparison function 406 determines that the WSD protocol of the device 102 is enabled. In this case, the information comparison function 406 determine that the setting information of the port 408 matches that of the device 102 (step S1303), and advances the process to step S904 of FIG. 9. On the other hand, if detection of the device 102 has failed (NO in step S1302), the information comparison function 406 determines that the WSD protocol of the device 102 is disabled. In this case, the information comparison function 406 determines that the setting information of the port 408 does not match that of the device 102 (step S1304), and advances the process to step S904 of FIG. 9. The enabling/disabling of the WSD protocol can be determined based on the information obtained by the device information obtaining function 404. On the other hand, for example, the WSD protocol may be disabled in the computer 101 or the network 104 may not support the WSD protocol. In this case, printing using the WSD port undesirably fails. In this case as well, the user can confirm enabling/disabling of the WSD function of the device 102 using the search module supporting the WSD protocol, as shown in FIG. 13. Furthermore, using the search module supporting the WSD protocol, as shown in FIG. 13, the user can confirm whether the computer 101 or the environment of the network 104 supports the WSD protocol.

Figure 14:
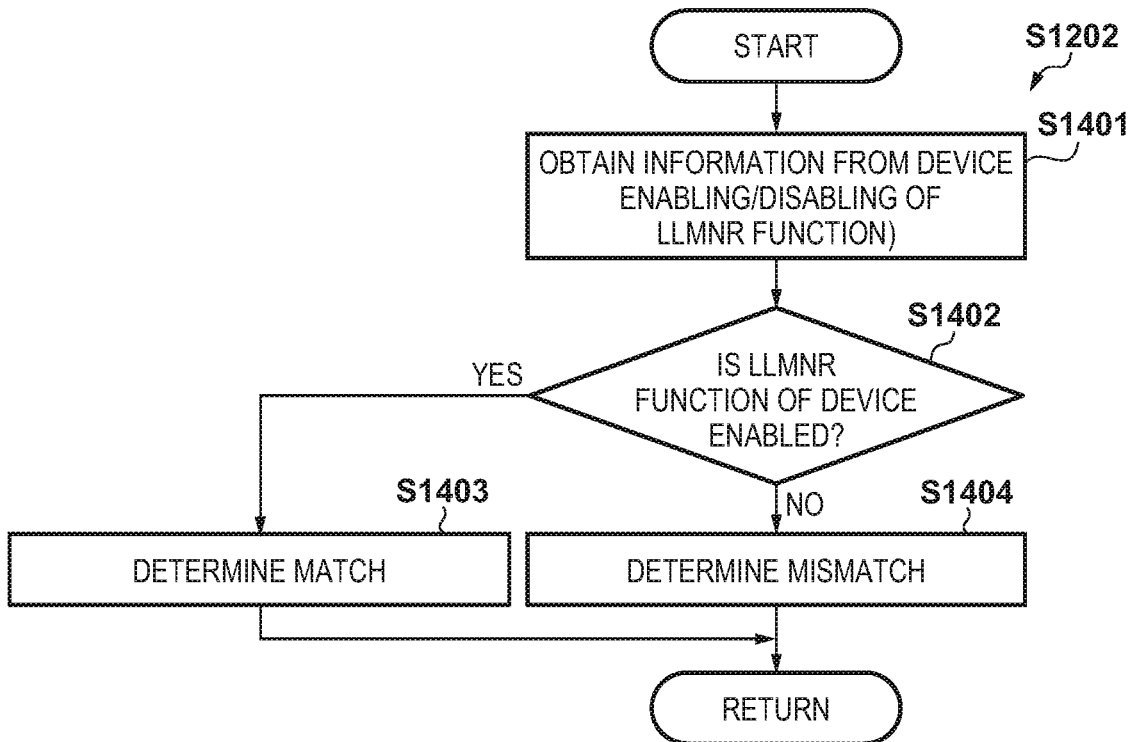
FIG. 14 is a flowchart illustrating an example of the procedure of printing enabling/disabling determination processing.

Subsequently, the printing enabling/disabling determination processing (step S1202) of the host name port will be described with reference to FIGS. 14 and 15. FIG. 14 shows a processing example when an LLMNR name is set in the device host name portion in the setting information of the port 408 shown in FIG. 5C. On the other hand, FIG. 15 shows a processing example when a DNS host name is set in the device host name portion in the setting information of the port 408 shown in FIG. 5C.

Referring to FIG. 14, using the information obtained by the device information obtaining function 404, the information comparison function 406 confirms whether the LLMNR function of the device 102 is enabled/disabled (step S1401). If the LLMNR function of the device 102 is enabled (YES in step S1402), the information comparison function 406 determines that the setting information of the port 408 matches that of the device 102 (step S1403), and advances the process to step S904 of FIG. 9. On the other hand, if the LLMNR function of the device 102 is disabled (NO in step S1402), the information comparison function 406 determines that the setting information of the port 408 does not match that of the device 102 (step S1404), and advances the process to step S904 of FIG. 9.

Figure 15:
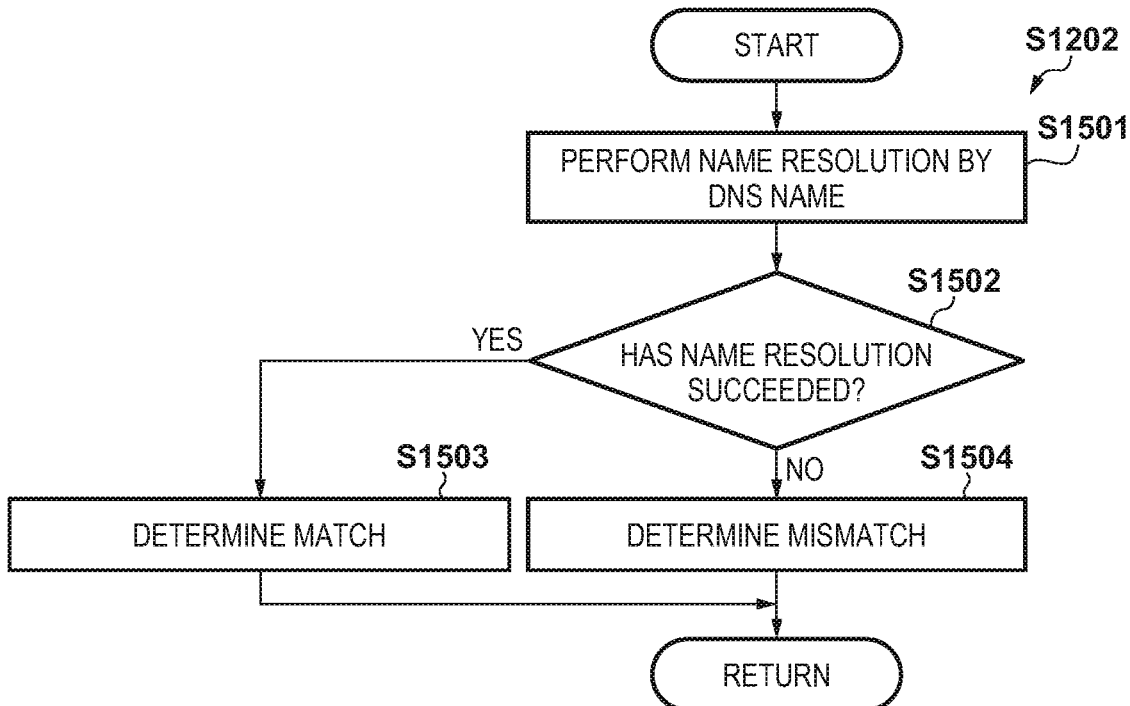
FIG. 15 is a flowchart illustrating another example of the procedure of the printing enabling/disabling determination processing.

Referring to FIG. 15, the information comparison function 406 attempts name resolution by the DNS host name set in the printing port 408 registered in the computer 101 (step S1501). At this time, if name resolution in step S1501 has succeeded (YES in step S1502), the information comparison function 406 determines that the setting information of the port 408 matches that of the device 102 (step S1503), and advances the process to step S904 of FIG. 9. On the other hand, if name resolution in step S1501 has failed (NO in step S1502), the information comparison function 406 determines that the setting information of the port 408 does not match that of the device 102 (step S1504), and advances the process to step S904 of FIG. 9.

If the DNS host name is used as the setting information of the port, even if the DNS function of the device is enabled, printing from the port fails unless the network environment includes a DNS server. To cope with this, in this processing example, it can be confirmed whether the network environment supports name resolution of the DNS host name by attempting name resolution by the DNS host name in the setting information of the port. If the LLMNR function is used to set the port, name resolution is possible even in the network environment including no DNS server. By enabling the LLMNR function on the device side, printing using the port registered in the computer 101 can succeed. When the screen shown in FIG. 7A including information indicating that printing can be executed by only changing the setting of the router 103 or the device 102 is displayed to notify the user of it, the user can execute printing without installing an unnecessary driver.

Note that the above example has explained a case in which a device search is performed by the WSD protocol with reference to FIG. 13. However, for example, the device information obtaining function 404 may obtain enabling/disabling information of the WSD function in the device. Furthermore, determination based on the enabling/disabling information of the WSD function obtained by the device information obtaining function 404 and determination based on the result of the device search by the WSD protocol may be used in combination. If, for example, both the determination processes indicate that the WSD function of the device is enabled, it can be determined that the setting information of the port matches that of the device. Furthermore, the above example has explained, with reference to FIG. 14, a case in which the enabling/disabling information of the LLMNR function is obtained from the device 102 and it is determined whether the LLMNR function is enabled. However, the present invention is not limited to this. For example, the determination processing in step S1402 may be performed by attempting name resolution using the LLMNR name set in the port 408 as in step S1502 of FIG. 15. Note that determination based on the obtained information and determination based on the result of attempting name resolution may be combined. If, for example, both the determination processes indicate that the LLMNR function is enabled in the device, it can be determined that the setting information of the port matches that of the device. The above example has explained a case in which name resolution by the DNS host name is attempted (step S1502) with reference to FIG. 15. However, for example, the device information obtaining function 404 may obtain the enabling/disabling information of the DNS function in the device. Determination based on the obtained information and determination based on the result of attempting name resolution may be combined. If, for example, both the determination processes indicate that the DNS function is enabled, it can be determined that the setting information of the port matches that of the device. In addition, in this embodiment, the information stored in the "device-specific ID portion" in the port information shown in FIG. 5B is a UUID. However, another identifier that can uniquely identify the device, such as a MAC address or a UUID of a version other than version 1, may be used.

Third Processing Example

As described above, a WS-Discovery function exists as one function of WSD. Using the WS-Discovery function, it is possible to detect a device connected to the network based on a UUID capable of uniquely identify the device. With respect to the WSD port, even if the IP address of the device 102 is changed, the setting information of the port can be automatically made to track the change using the function. Note that the UUID has a configuration different for each version. In the case of version 1, the UUID is configured to include the MAC address of the device. For the host name of the device, as an initial value, a value including the MAC address of the device or part of it is often set as a default value so as to discriminate the device from other devices. Assume, for example, that a WSD port is generated in the computer 101 in an environment in which the device 102 is connected to the router 103 via a wireless LAN. At this time, in the device-specific portion of the setting information of the port, as shown in FIG. 5B, a UUID including a MAC address for the wireless LAN is generated. After that, the user attempts to execute printing from the computer by changing the device connection method to a wired LAN. At this time, the value of the MAC address changes depending on the network interface of the device. Since the MAC address for the wireless LAN included in the UUID set in the WSD port is different from the MAC address for the wired LAN of the device, the computer 101 fails to execute printing. To cope with this, in this processing example, processing when the network interface of the device at the time of generating a port in the computer is different from the current network interface of the device will be described. Note that in the processing example, the device 102 supports both the interfaces for the wired LAN and wireless LAN, and is connected to the network 104 via the wired LAN. The device 102 supports the WSD, LLMNR, and DNS protocols. Furthermore, the host name of the device 102 includes the MAC address. If the network interface of the device 102 is changed, the value of the host name is also changed. This processing example assumes that the router 103 supports both the interfaces for the wired LAN and the wireless LAN. Note that the setting information of the port 408 corresponding to the device 102 is registered in the computer 101 in the format shown in FIG. 5B or 5C.

In this processing example as well, if the user activates the application 401, the device search function 402 detects the device 102. At this time, the MAC address of the device 102 obtained by the device search function 402 is the MAC address for the wired LAN. Next, if the user selects the device 102 included in the list 603, and presses the port confirmation button 604, the device information obtaining function 404 obtains the MAC address for the wireless LAN. The information comparison function 406 executes the processing shown in FIG. 9. Since, as described above, the setting information of the port is registered in the computer 101 in the format shown in FIG. 5B or 5C set by the automatic tracking method, the processing in step S1002 of FIG. 10 is executed as a result of executing the processing shown in FIG. 9.

Figure 16:
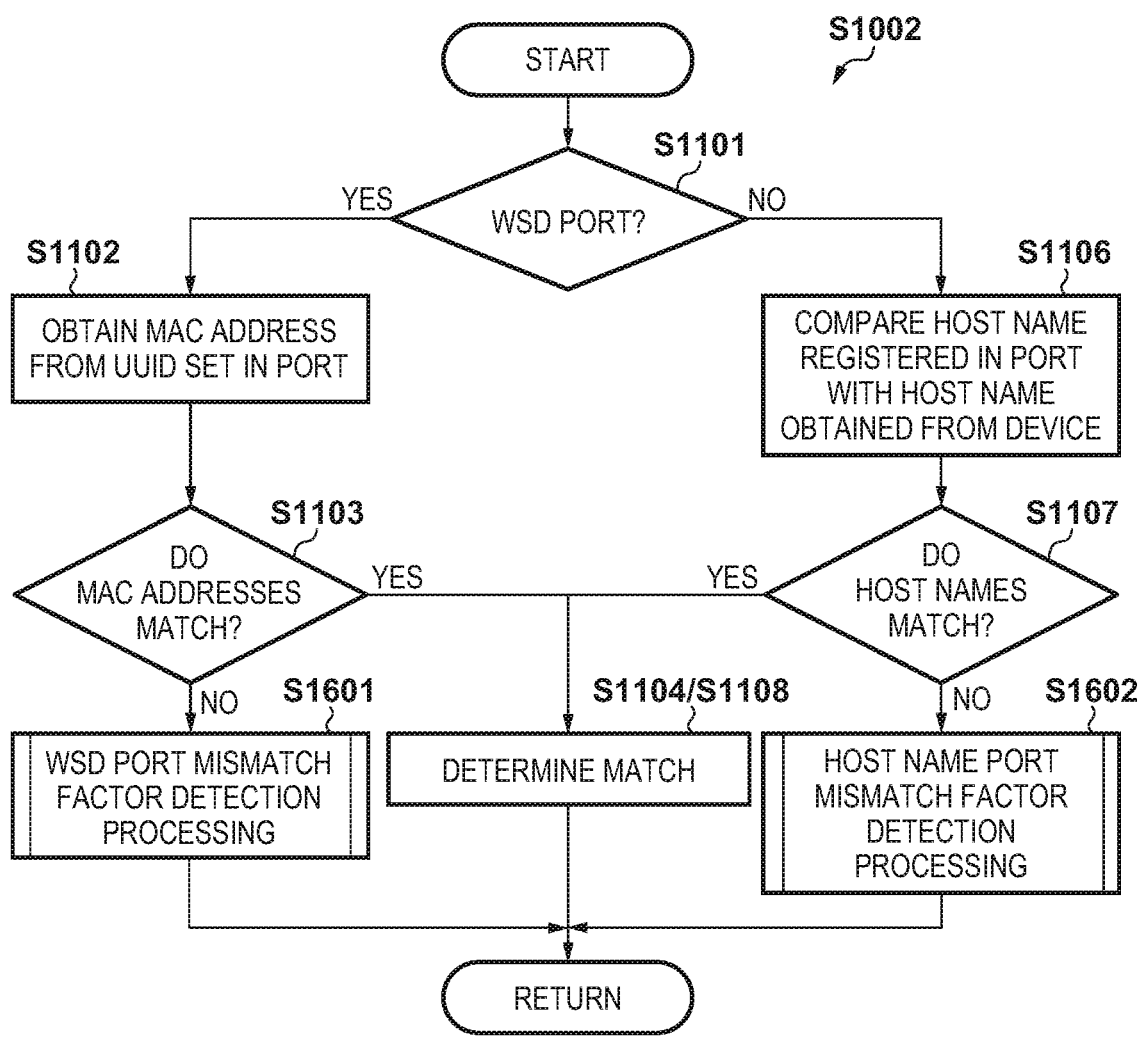
FIG. 16 is a flowchart illustrating still another example of the procedure of the comparison determination processing.

In this processing example, the processing shown in FIG. 16 is executed as the processing in step S1002, instead of the processing shown in FIG. 11. Note that in FIG. 16, the same reference symbols as in FIG. 11 denote steps in which the same processes as those in FIG. 11 are executed and a description thereof will be omitted. Referring to FIG. 16, if it is determined in step S1103 that the MAC address in the setting information of the port 408 does not match the MAC address of the device 102 (NO in step S1103), the information comparison function 406 performs WSD port mismatch factor detection processing (step S1601). If it is determined in step S1107 that the host name in the setting information of the port 408 does not match the host name of the device 102 (NO in step S1107), the information comparison function 406 performs host name port mismatch factor detection processing (step S1602).

Figure 17:
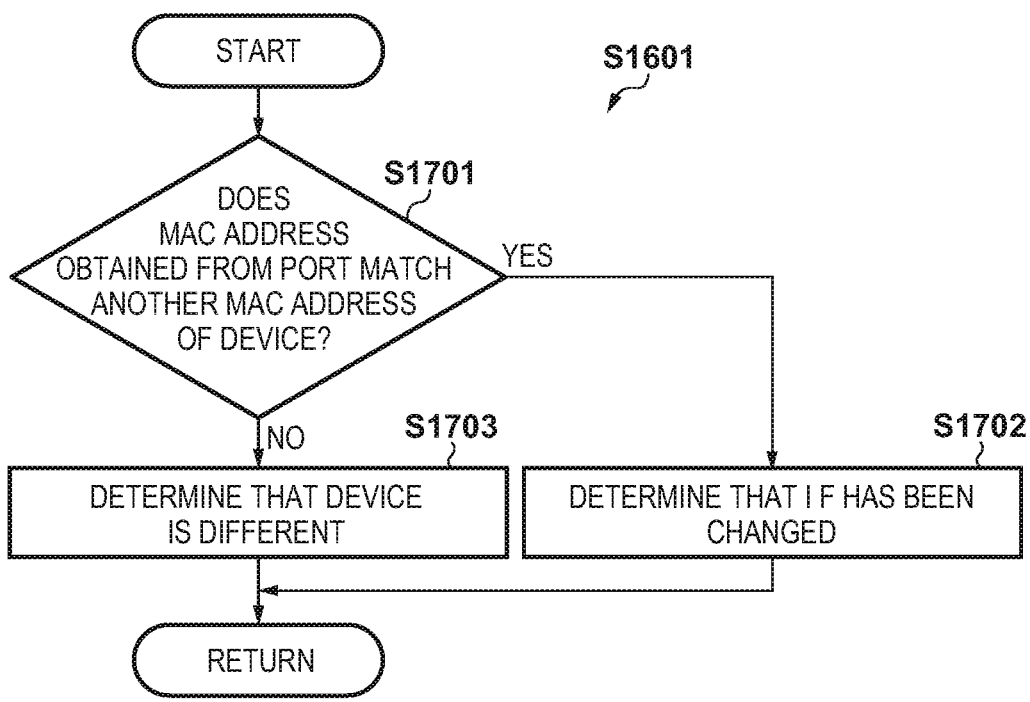
FIG. 17 is a flowchart illustrating an example of the procedure of mismatch factor detection processing.

The WSD port mismatch factor detection processing (step S1601) will be described with reference to FIG. 17. Referring to FIG. 17, the information comparison function 406 compares the MAC address of the device 102 obtained from the UUID registered in the setting information of the port 408 with the MAC address for the wireless LAN previously obtained by the device information obtaining function 404 (step S1701). That is, the device 102 is connected to the network 104 via a wire at this time. However, when the device 102 was previously connected to the network 104 by the wireless LAN, the computer 101 obtained the MAC address for the wireless LAN. Therefore, the information comparison function 406 compares the previously obtained MAC address for the wireless LAN with the MAC address based on the setting information of the port. If the MAC addresses match (YES in step S1701), the information comparison function 406 determines that a change in communication interface used by the device 102 between the time of generating the setting information of the port and the current time is a mismatch factor (step S1702). On the other hand, if the MAC addresses do not match (NO in step S1701), the information comparison function 406 determines that generation of the port for a device different from the device 102 is a mismatch factor (step S1703). Then, after the end of the determination processing, the information comparison function 406 advances the process to step S904 of FIG. 9.

Figure 18:
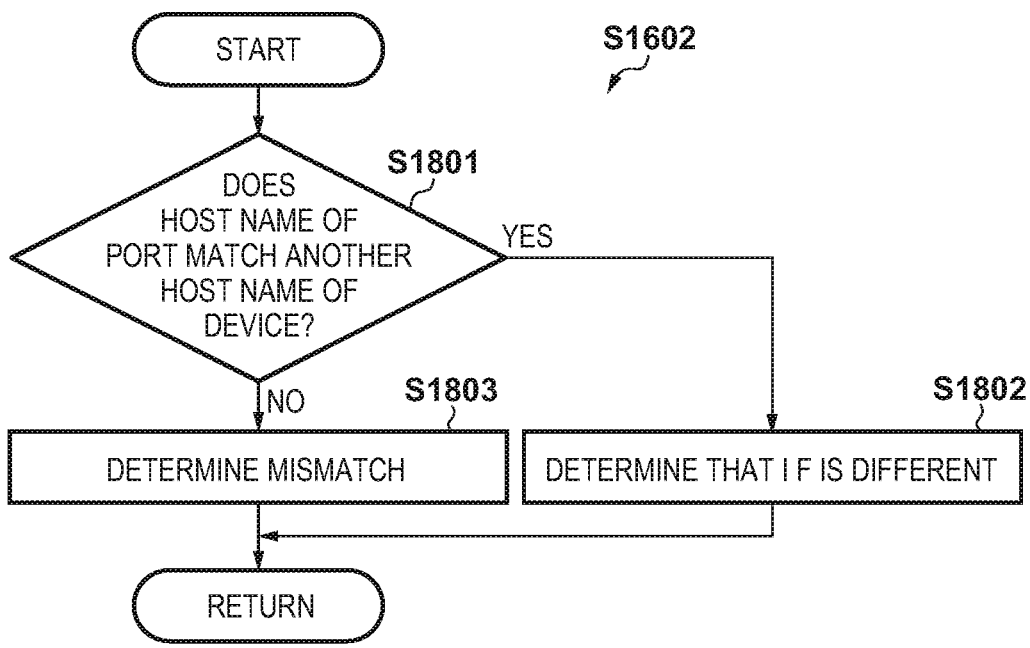
FIG. 18 is a flowchart illustrating an example of the procedure of mismatch factor detection processing.

The host name port mismatch factor detection processing (step S1602) will be described next with reference to FIG. 18. Referring to FIG. 18, the information comparison function 406 compares the host name of the device registered in the setting information of the port 408 with the host name of the device 102 for the wireless LAN previously obtained by the device information obtaining function 404 (step S1801).

That is, the device 102 is connected to the network 104 via a wire at this time. However, when the device 102 was previously connected to the network 104 by the wireless LAN, the computer 101 obtained the host name for the wireless LAN. Therefore, the information comparison function 406 compares the previously obtained host name for the wireless LAN with the host name based on the setting information of the port. If the host names match (YES in step S1801), the information comparison function 406 determines that a change in communication interface used by the device 102 between the time of generating the setting information of the port and the current time is a mismatch factor (step S1802). On the other hand, if these host names do not match (NO in step S1801), the information comparison function 406 determines that the setting information of the port does not match that of the device (step S1803). After the end of the determination processing, the information comparison function 406 advances the process to step S904 of FIG. 9.

Assume, for example, that the user generates a WSD port in the computer 101 by a driver installer or the like in a state in which the device 102 is connected to the network 104 by the wireless LAN. In this case, a UUID set in the WSD port includes the MAC address of the device 102 for the wireless LAN. After that, assume that the user switches the network interface of the device 102 from the wireless LAN to the wired LAN. In this case, the MAC address of the device 102 for the wireless LAN is changed to that for the wired LAN. Thus, the MAC address does not match the MAC address included in the UUID set in the port 408. In this processing example, a factor in a mismatch between the MAC addresses can be specified. As a result, for example, guidance to return the interface of the device 102 from the wired LAN to the wireless LAN can be displayed in the guidance 704 shown in FIG. 7A. It is possible to notify the user that he/she can execute printing from the computer 101 by the previously generated WSD port by switching the interface in accordance with the guidance. Thus, the user need not unnecessarily generate a port by, for example, installing the driver. Note that the same applies to a case in which the default value of the host name of the device 102 includes the MAC address. Note that in this embodiment, the information stored in the "device-specific ID portion" in the port information shown in FIG. 5B is a UUID. However, another identifier that can uniquely identify the device, such as a MAC address or a UUID of a version other than version 1, may be used.

A method of downloading the application 401 described above will be explained. For example, if the user instructs, from the computer 101, the designated device to transmit print data, and the processing abnormally ends, an error message screen is displayed on the computer 101. When the error message screen includes a button for opening a Web browser, and the user presses the button, the Web browser is activated to display a screen associated with an error handling method. It is possible to download the application 401 using the screen associated with the error handling method.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-095847, filed May 12, 2017, which is hereby incorporated by reference herein in its entirety.

What is claimed is:

1. A non-transitory computer-readable storage medium storing a computer program for causing a computer, included in an apparatus connected to a network, to:

execute search processing of searching for a device connected to the network;

display, on a display unit, a selection screen including identification information corresponding to the device connected to the network based on a search result of the search processing;

designate a device based on operation of a user using the selection screen;

compare an IP address included in setting information of the designated device stored in the apparatus with an IP address of the designated device obtained by the search processing, if a setting method of the IP address included in the setting information of the designated device stored in the apparatus is a fixed setting method;

display, on the display unit, in a case where it is determined that the IP address included in the setting information of the designated device stored in the apparatus matches the IP address of the designated device obtained by the search processing, a screen including first information that indicates that it is possible to communicate with the designated device;

display, on the display unit, in a case where it is determined that the IP address included in the setting information of the designated device stored in the apparatus does not match the IP address of the designated device obtained by the search processing, a screen including second information that indicates that an error occurs in communication with the designated device; and compare a value used to automatically set the IP address and obtained from the setting information of the designated device with the value in information obtained from the designated device, if the setting method of the IP address included in the setting information of the designated device is an automatic setting method, wherein if a type of port included in the setting information of the designated device is a WSD (WebService on Devices), the value is a MAC address, and wherein if the type of port included in the setting information of the designated device is not a WSD (Web Service on Devices), the value is a host name.

2. The medium according to claim 1, wherein a screen including third information that indicates that the setting information does not exist is displayed on the display unit, if the setting information of the designated device is not stored in the apparatus.

3. The medium according to claim 1, wherein a screen including the second information is displayed on the display unit, if the setting method of the IP address included in the setting information of the designated device is the fixed setting method, if the setting method of the IP address included in information obtained from the designated device is the automatic setting method, and if the IP address included in the setting information of the designated device matches the IP address of the designated device obtained from the designated device.

4. The medium according to claim 1, wherein the computer program causes the computer to:

display, on the display unit, a screen including the first information, if the setting method of the IP address included in the setting information of the designated device is the fixed setting method, if the setting method of the IP address included in the information obtained from the designated device is the fixed setting method, and if the IP address included in the setting information of the designated device matches the IP address of the designated device obtained by the designated device.

5. The medium according to claim 1, wherein
the designated device is a printer, and
the setting information is setting information of a port for executing printing by the printer.

6. The medium according to claim 1, wherein the first information that indicates that it is possible to communicate with the designated device includes an item indicative of performing print processing.

7. The medium according to claim 1, wherein the second information that indicates that an error occurs in communication with the designated device includes a message for prompting a change of the setting information.

8. A method executed by an apparatus connected to a network, comprising:

executing search processing of searching for a device connected to the network;

displaying, on a display unit, a selection screen including identification information corresponding to the device connected to the network based on a search result of the search processing;

designating a device based on operation of a user using the selection screen;

comparing an IP address included in setting information of the designated device stored in the apparatus with an IP address of the designated device obtained by the search processing, if a setting method of the IP address included in the setting information of the designated device stored in the apparatus is a fixed setting method;

displaying, on the display unit, in a case where it is determined that the IP address included in the setting information of the designated device stored in the apparatus matches the IP address of the designated device obtained by the search processing, a screen including first information that indicates that it is possible to communicate with the designated device;

displaying, on the display unit, in a case where it is determined that the IP address included in the setting information of the designated device stored in the apparatus does not match the IP address of the designated device obtained by the search processing, a screen including second information that indicates that an error occurs in communication with the designated device; and comparing a value used to automatically set the IP address and obtained from the setting information of the designated device with the value in information obtained from the designated device, if the setting method of the IP address included in the setting information of the designated device is an automatic setting method, wherein if a type of port included in the setting information of the designated device is a WSD (WebService on Devices), the value is a MAC address, and if the type of port included in the setting information of the designated device is not a WSD (Web Service on Devices), the value is a host name.

9. The method according to claim 8, wherein, a screen including third information that indicates that the setting information does not exist is displayed on the display unit, if the setting information of the designated device is not stored in the apparatus.

10. The method according to claim 8, wherein a screen including the second information is displayed on the display unit, if the setting method of the IP address included in the setting information of the designated device is the fixed setting method, if the setting method of the IP address included in information obtained from the designated device is the automatic setting method, and if the IP address included in the setting information of the designated device matches the IP address of the designated device obtained from the designated device.

11. The method according to claim 8, further comprising:

displaying on the display unit, a screen including the first information, if the setting method of the IP address included in the setting information of the designated device is the fixed setting method, if the setting method of the IP address included in the information obtained from the designated device is the fixed setting method, and if the IP address included in the setting information of the designated device matches the IP address of the designated device obtained by the designated device.

12. The method according to claim 8, wherein
the designated device is a printer, and
the setting information is setting information of a port for executing printing by the printer.

13. The method according to claim 8, wherein the first information that indicates that it is possible to communicate with the designated device includes an item indicative of performing print processing.

14. The method according to claim 8, wherein the second information that indicates that an error occurs in communication with the designated device includes a message for prompting a change of the setting information.

15. A method executed by an apparatus connected to a network, comprising:

executing search processing of searching for a device connected to the network;

displaying, on a display unit, a selection screen including identification information corresponding to the device connected to the network based on a search result of the search processing;

designating a device based on operation of a user using the selection screen;

comparing a value used to automatically set an IP address and obtained from setting information of the designated device stored in the apparatus with the value in information obtained from the designated device by the search processing, if a setting method of the IP address included in the setting information of the designated device stored in the apparatus is an automatic setting method, wherein if a type of port included in the setting information of the designated device is a WSD (Web Service on Devices), the value is a MAC address, and if the type of port included in the setting information of the designated device is not a WSD (Web Service on Devices), the value is a host name;

displaying, on a display unit, in a case where the value obtained from the setting information of the designated device matches the value in the information obtained from the designated device, a screen including first information that indicates that it is possible to communicate with the designated device; and displaying, on the display unit, in a case where the value obtained from the setting information of the designated device does not match the value in the information obtained from the designated device, a screen including second information that indicates that an error occurs in communication with the designated device.

16. The method according to claim 15, wherein a screen including third information that indicates that the setting information does not exist is displayed on the display unit, if the setting information of the designated device is not stored in the apparatus.

17. The method according to claim 15, the MAC address is obtained from a UUID included in the setting information.

* * * * *